(12) United States Patent
Hirota et al.

(10) Patent No.: US 11,240,397 B2
(45) Date of Patent: Feb. 1, 2022

(54) INFORMATION PROCESSING SYSTEM, INFORMATION PROCESSING APPARATUS, COMPUTER-READABLE NON-TRANSITORY RECORDING MEDIUM STORING INFORMATION PROCESSING PROGRAM, AND SLAVE SYSTEM

(71) Applicant: KYOCERA Document Solutions Inc., Osaka (JP)

(72) Inventors: Masato Hirota, Osaka (JP); Takehiko Asano, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/029,310

(22) Filed: Sep. 23, 2020

(65) Prior Publication Data

US 2021/0099606 A1 Apr. 1, 2021

(30) Foreign Application Priority Data

Sep. 27, 2019 (JP) .............................. JP2019-176653

(51) Int. Cl.
*H04N 1/32* (2006.01)
*H04N 1/44* (2006.01)
*H04N 1/00* (2006.01)

(52) U.S. Cl.
CPC ..... *H04N 1/32368* (2013.01); *H04N 1/32096* (2013.01); *H04N 1/32101* (2013.01); *H04N 1/00212* (2013.01); *H04N 1/4413* (2013.01)

(58) Field of Classification Search
None
See application file for complete search history.

(56) References Cited

U.S. PATENT DOCUMENTS

| | | | | |
|---|---|---|---|---|
| 2010/0241695 | A1* | 9/2010 | Sagara | G06F 3/1203 709/203 |
| 2013/0046843 | A1* | 2/2013 | Sagara | H04L 41/0886 709/208 |
| 2016/0381245 | A1* | 12/2016 | Hirota | H04N 1/32625 358/1.15 |
| 2019/0253573 | A1* | 8/2019 | Nakayama | H04L 41/0853 |

FOREIGN PATENT DOCUMENTS

JP 2005-293088 10/2005

\* cited by examiner

*Primary Examiner* — Miya J Williams
(74) *Attorney, Agent, or Firm* — Lex IP Meister, PLLC

(57) ABSTRACT

When an image forming apparatus acquires notification destination information from a document processing flow execution system, and is instructed to change information, the image forming apparatus requests that a master system, indicated by the notification destination information, change the information. The master system changes the information held by the master system itself as requested by the image forming apparatus. When the image forming apparatus is notified about the successful change of information from the master system, the image forming apparatus notifies a slave system, indicated by the notification destination information, about the change of information. When the slave system is notified about the change of information by the image forming apparatus, the slave system changes the information held by the slave system itself to the information acquired from the master system.

8 Claims, 21 Drawing Sheets

FIG. 2

| DOCUMENT PROCESSING FLOW EXECUTION SYSTEM | AUTHENTICATION AND AUTHORIZATION SYSTEM | USER INFORMATION HOLDING SYSTEM |
|---|---|---|
| USERNAME PASSWORD EMAIL ADDRESS LANGUAGE PIN CODE FOLDER INFORMATION | USERNAME PASSWORD EMAIL ADDRESS LANGUAGE PIN CODE ID CARD INFORMATION AUTHORIZATION INFORMATION ACCOUNTING | USERNAME PASSWORD EMAIL ADDRESS |

FIG. 9

54b PRIORITY ORDER INFORMATION

|  | SYSTEM | | |
|---|---|---|---|
|  | USER INFORMATION HOLDING SYSTEM | AUTHENTICATION AND AUTHORIZATION SYSTEM | DOCUMENT PROCESSING FLOW EXECUTION SYSTEM |
| USERNAME | 1 | 2 | 3 |
| PASSWORD | 1 | 2 | 3 |
| EMAIL ADDRESS | 1 | 2 | 3 |
| LANGUAGE |  | 1 | 2 |
| PIN CODE |  | 1 | 2 |
| FOLDER INFORMATION |  |  | 1 |

FIG. 10

54c CHANGEABILITY INFORMATION

| | CHANGEABILITY |
|---|---|
| USERNAME | IMPOSSIBLE |
| PASSWORD | IMPOSSIBLE |
| EMAIL ADDRESS | IMPOSSIBLE |
| LANGUAGE | POSSIBLE |
| PIN CODE | POSSIBLE |
| FOLDER INFORMATION | POSSIBLE |

FIG. 11

54d NOTIFICATION DESTINATION INFORMATION

| | MASTER SYSTEM | SLAVE SYSTEM |
|---|---|---|
| USERNAME | n/a | n/a |
| PASSWORD | n/a | n/a |
| EMAIL ADDRESS | n/a | n/a |
| LANGUAGE | AUTHENTICATION AND AUTHORIZATION SYSTEM | DOCUMENT PROCESSING FLOW EXECUTION SYSTEM |
| PIN CODE | AUTHENTICATION AND AUTHORIZATION SYSTEM | DOCUMENT PROCESSING FLOW EXECUTION SYSTEM |
| FOLDER INFORMATION | DOCUMENT PROCESSING FLOW EXECUTION SYSTEM | n/a |

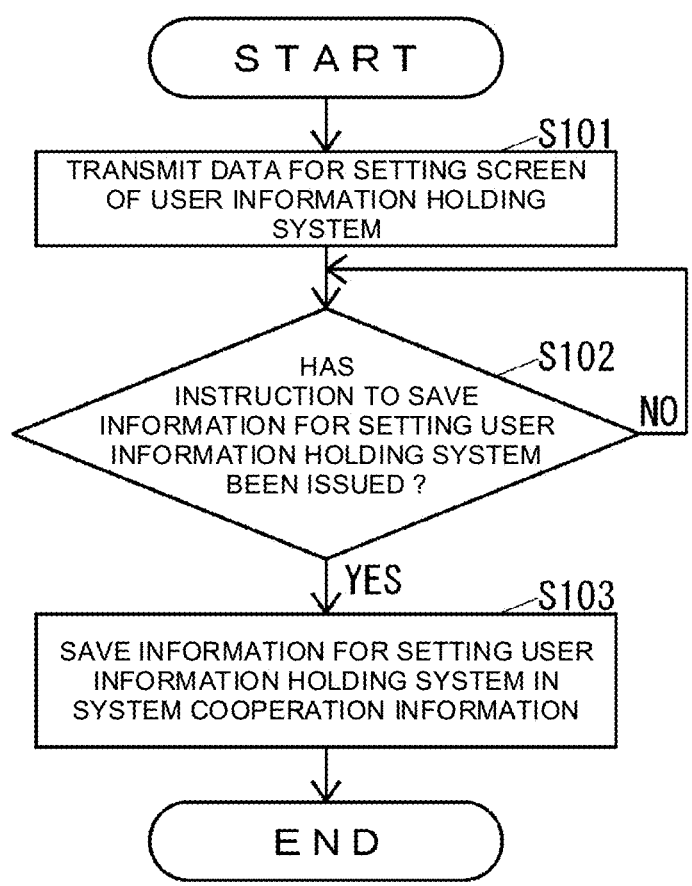

INFORMATION PROCESSING SYSTEM, INFORMATION PROCESSING APPARATUS, COMPUTER-READABLE NON-TRANSITORY RECORDING MEDIUM STORING INFORMATION PROCESSING PROGRAM, AND SLAVE SYSTEM

INCORPORATION BY REFERENCE

This application is based upon, and claims the benefit of priority from, corresponding Japanese Patent Application No. 2019-176653 filed in the Japan Patent Office on Sep. 27, 2019, the entire contents of which are incorporated herein by reference.

BACKGROUND

Field of the Invention

The present disclosure relates to an information processing system including a plurality of systems, an information processing apparatus, a computer-readable non-transitory recording medium storing an information processing program, and a slave system.

Description of Related Art

Conventionally, there has been known an information processing system including a plurality of systems, each of which holds the same information. In the conventional information processing system, when information is changed in a master system among the plurality of systems, the master system synchronizes the information with a slave system among the plurality of systems.

SUMMARY

An information processing system of the present disclosure includes a plurality of systems having a main system that includes notification destination information indicating a notification destination for a change regarding a specific type of information, and an information processing apparatus configured to be instructed to change the specific type of information in the plurality of systems. The notification destination information indicates a master system in the plurality of systems and a slave system in the plurality of systems as the notification destination. When the information processing apparatus acquires the notification destination information from the main system, and is instructed to change the specific type of information, the information processing apparatus requests that the master system of the specific type of information, as indicated by the notification destination information, change the specific type of information. When the master system is requested from the information processing apparatus that the specific type of information be changed, the master system changes the specific type of information held by the master system itself as requested by the information processing apparatus, and notifies the information processing apparatus about a successful change of the specific type of information. When the information processing apparatus is notified about the successful change of the specific type of information from the master system, the information processing apparatus notifies the slave system of the specific type of information, as indicated by the notification destination information, about the change of the specific type of information, and when the slave system is notified about the change of the specific type of information from the information processing apparatus, the slave system acquires the specific type of information held by the master system from the master system, and changes the specific type of information held by the slave system itself to information acquired from the master system.

According to the information processing system of the present disclosure, the main system may include priority order information indicating a priority order of the system regarding the specific type of information, and generate the notification destination information based on an actual configuration of the plurality of systems and the priority order information.

According to the information processing system of the present disclosure, the main system may include changeability information indicating whether the change regarding the specific type of information is possible, and in the case that the information processing apparatus acquires the changeability information from the main system, and is instructed to change the specific type of information, when the changeability information indicates that the change regarding the specific type of information is impossible, the information processing apparatus may not request that the master system of the specific type of information change the specific type of information.

According to the information processing system of the present disclosure, after the information processing apparatus requests that the master system change the specific type of information, when there is no response from the master system for a specific time, the information processing apparatus may again request that the master system change the specific type of information.

According to the information processing system of the present disclosure, after the information processing apparatus notifies the slave system about the change of the specific type of information, when there is no response from the slave system for a specific time, the information processing apparatus may again notify the slave system about the change of the specific type of information.

According to the information processing system of the present disclosure, after the slave system attempts to acquire the specific type of information from the master system, when the slave system does not successfully acquire the specific type of information from the master system for a specific time, the slave system may again attempt to acquire the specific type of information from the master system.

An information processing apparatus of the present disclosure is an information processing apparatus which is instructed to change a specific type of information in a plurality of systems having a main system that includes notification destination information indicating a notification destination for a change regarding the specific type of information. The notification destination information indicates a master system in the plurality of systems and a slave system in the plurality of systems as the notification destination. When the information processing apparatus acquires the notification destination information from the main system, and is instructed to change the specific type of information, the information processing apparatus requests that the master system of the specific type of information, as indicated by the notification destination information, change the specific type of information, and when the information processing apparatus is notified about a successful change of the specific type of information from the master system, the information processing apparatus notifies the slave system of the specific type of information indicated by the notification destination information about the change of the specific type of information.

A non-transitory computer-readable recording medium of the present disclosure stores an information processing program. The information processing program causes a computer to realize: a function of acquiring notification destination information from a main system in a plurality of systems that include the main system which includes the notification destination information, indicating a master system of the plurality of systems, and a slave system of the plurality of systems as the notification destination for a change regarding a specific type of information; a function of requesting change of the specific type of information to the master system of the specific type of information, as indicated by the notification destination information, when the change of the specific type of information is instructed, and a function of notifying the slave system of the specific type of information, as indicated by the notification destination information about the change of the specific type of information when a successful change of the specific type of information is notified from the master system.

A slave system of the present disclosure is a slave system regarding a specific type of information. When a change of the specific type of information is notified from an information processing apparatus, the slave system acquires the specific type of information held by a master system regarding the specific type of information, from the master system, and changes the specific type of information held by the slave system itself to information acquired from the master system.

BRIEF DESCRIPTION OF THE DRAWINGS

FIG. 2 is a diagram showing an example of information for each user held by each of a document processing flow execution system, an authentication and authorization system, and a user information holding system shown in FIG. 1;

FIG. 9 is a diagram showing an example of priority order information shown in FIG. 8;

FIG. 10 is a diagram showing an example of changeability information shown in FIG. 8;

FIG. 11 is a diagram showing an example of notification destination information shown in FIG. 8;

FIG. 12 is a flowchart showing the operation of the document processing flow execution system shown in FIG. 8 when cooperating with another system;

DETAILED DESCRIPTION

Hereinafter, embodiments of the present disclosure will be described with reference to the drawings.

First, the configuration of an information processing system according to an embodiment of the present disclosure will be described.

Figure 1:
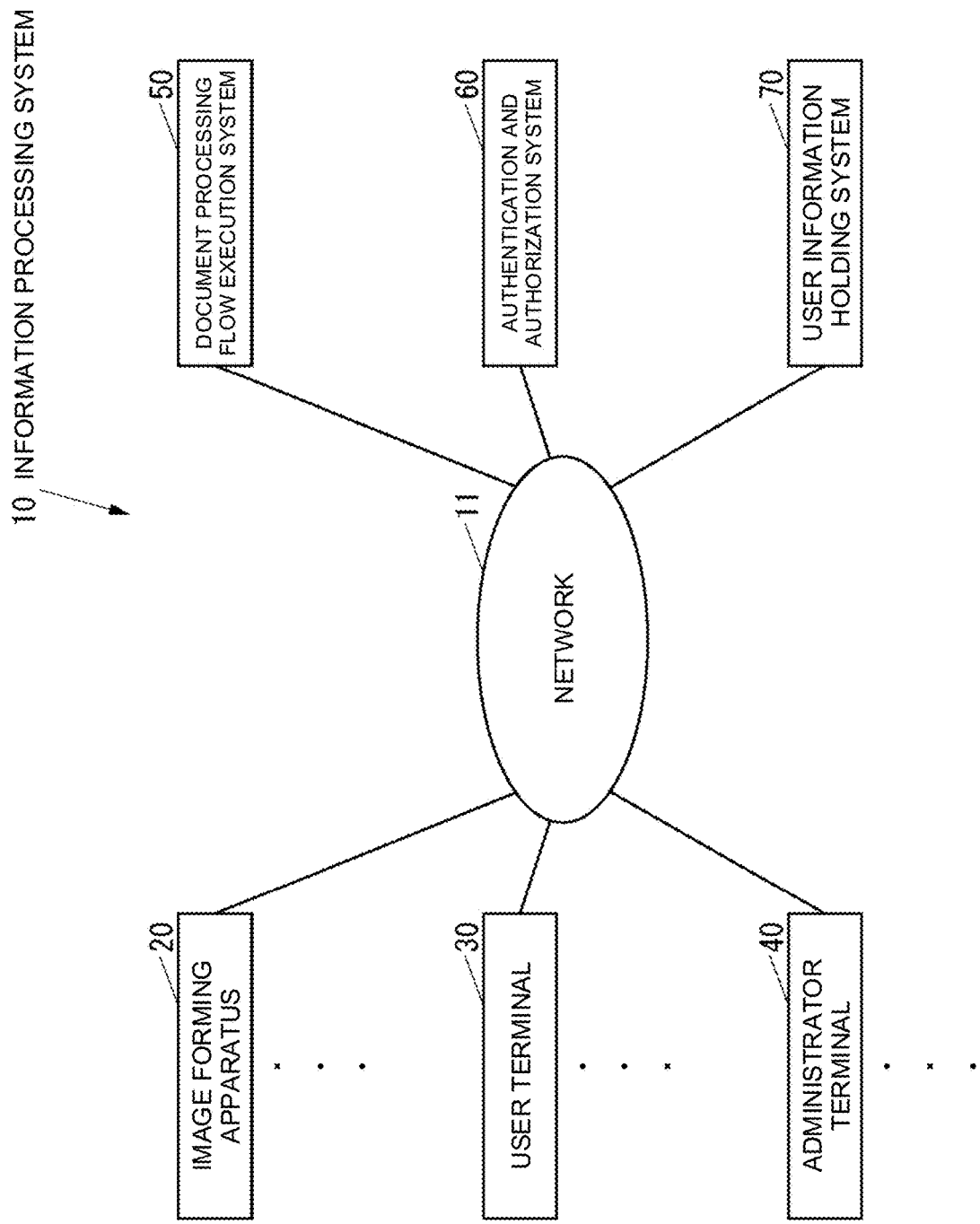
FIG. 1 is a block diagram of an information processing system according to an embodiment of the present disclosure.

FIG. 1 is a block diagram of an information processing system 10 according to the present embodiment.

As shown in FIG. 1, the information processing system 10 includes an image forming apparatus 20 as an information processing apparatus. The information processing system 10 may include at least one image forming apparatus having a configuration similar to that of the image forming apparatus 20, in addition to the image forming apparatus 20. The image forming apparatus in the information processing system 10 is configured by a multifunction peripheral (MFP) or the like, for example.

The information processing system 10 includes a user terminal 30 as an information processing apparatus used by a user of the information processing system 10. The information processing system 10 may include at least one user terminal having a configuration similar to that of the user terminal 30, in addition to the user terminal 30. The user terminal in the information processing system 10 is configured by a computer such as a personal computer (PC), for example.

The information processing system 10 includes an administrator terminal 40 used by an administrator on the user side (hereinafter, simply referred to as "administrator") of the information processing system 10. The information processing system 10 may include at least one administrator terminal having a configuration similar to that of the administrator terminal 40, in addition to the administrator terminal 40. The administrator terminal in the information processing system 10 is configured by a computer such as a PC, for example.

The information processing system 10 includes a document processing flow execution system 50 as a main system that executes a document processing flow as a workflow for document processing. The document processing flow execution system 50 may be configured by one or more computers. The document processing flow executed by the document processing flow execution system 50 includes an input stage of inputting a document, a document processing stage of executing various processing on the input document, and an output stage of outputting the processing result in the document processing stage. The method of inputting a document in the input stage may be achieved by various methods such as a method of inputting an image read from a paper by a scanner of an image forming apparatus as a document, a method of inputting a document disposed in a specific folder, and a method of inputting a document attached to a received email. The processing on a document in the document processing stage may be achieved by various processing such as an optical character recognition (OCR) processing for generating a text from an image as a document, processing for executing a specific correction such as a tilt correction on an image as a document, and processing for converting a format of an image as a document. The method of outputting the processing result in the output stage may be achieved by various methods such as a method of outputting the processing result to a specific folder, and a method of transmitting the processing result to a specific destination by an email. The document processing flow execution system 50 can store a plurality of document processing flows. The document processing flow execution system 50 can store a new document processing flow in response to an instruction from the administrator terminal, and change or delete a document processing flow that has already been stored in response to an instruction from the administrator terminal, for example.

The information processing system 10 may include an authentication and authorization system 60 that executes authentication and authorization of a user of the information processing system 10. The authentication and authorization system 60 may be configured by one or more computers. The authentication and authorization system 60 manages so as to limit various functions of the image forming apparatus for each user when each user uses the image forming apparatus. The authentication and authorization system 60 can provide, to the image forming apparatus or the document processing flow execution system 50, authorization information indicating restrictions on the use of the various functions of the image forming apparatus, regarding the authenticated user, that is, the user who has logged in to the image forming apparatus. The authentication and authorization system 60 can spool print data transmitted from a user terminal or output spooled print data to any image forming apparatus, for example. Further, the authentication and authorization system 60 may manage the use of the image forming apparatus 20 by a user of the information processing system 10.

The information processing system 10 can include a user information holding system 70 that holds information of a user of the information processing system 10. The user information holding system 70 may be configured by one or more computers. The user information holding system 70 can also hold information used in a system that is neither the document processing flow execution system 50 nor the authentication and authorization system 60.

The image forming apparatus, the user terminal, and the administrator terminal, the document processing flow execution system 50, the authentication and authorization system 60, and the user information holding system 70 in the information processing system 10 can be communicably connected to each other via a network 11 such as a local area network (LAN).

FIG. 2 is a diagram showing an example of information for each user held by each of the document processing flow execution system 50, the authentication and authorization system 60, and the user information holding system 70.

As shown in FIG. 2, the document processing flow execution system 50 holds general information of a user such as a username, a password, and an email address, a language used by the document processing flow execution system 50 and the authentication and authorization system 60, a PIN code used when logging in from the image forming apparatus, and folder information indicating a folder as an output destination of the execution result of the document processing flow.

As shown in FIG. 2, the authentication and authorization system 60 holds general information of a user such as a username, a password and an email address, language used by the document processing flow execution system 50 and the authentication and authorization system 60, and a PIN code used when logging in from the image forming apparatus, and ID card information indicating a ID card used when logging in from the image forming apparatus, authorization information, and an accounting indicating a current usage amount and a charge amount of the image forming apparatus.

As shown in FIG. 2, the user information holding system 70 holds general information of a user such as a username, a password, and an email address.

As shown in FIG. 2, the general information of a user such as a username, a password and an email address hold the same information by the document processing flow execution system 50, the authentication and authorization system 60, and the user information holding system 70, respectively. Further, the language and the PIN code hold the same information by the document processing flow execution system 50, and the authentication and authorization system 60, respectively.

Figure 3:
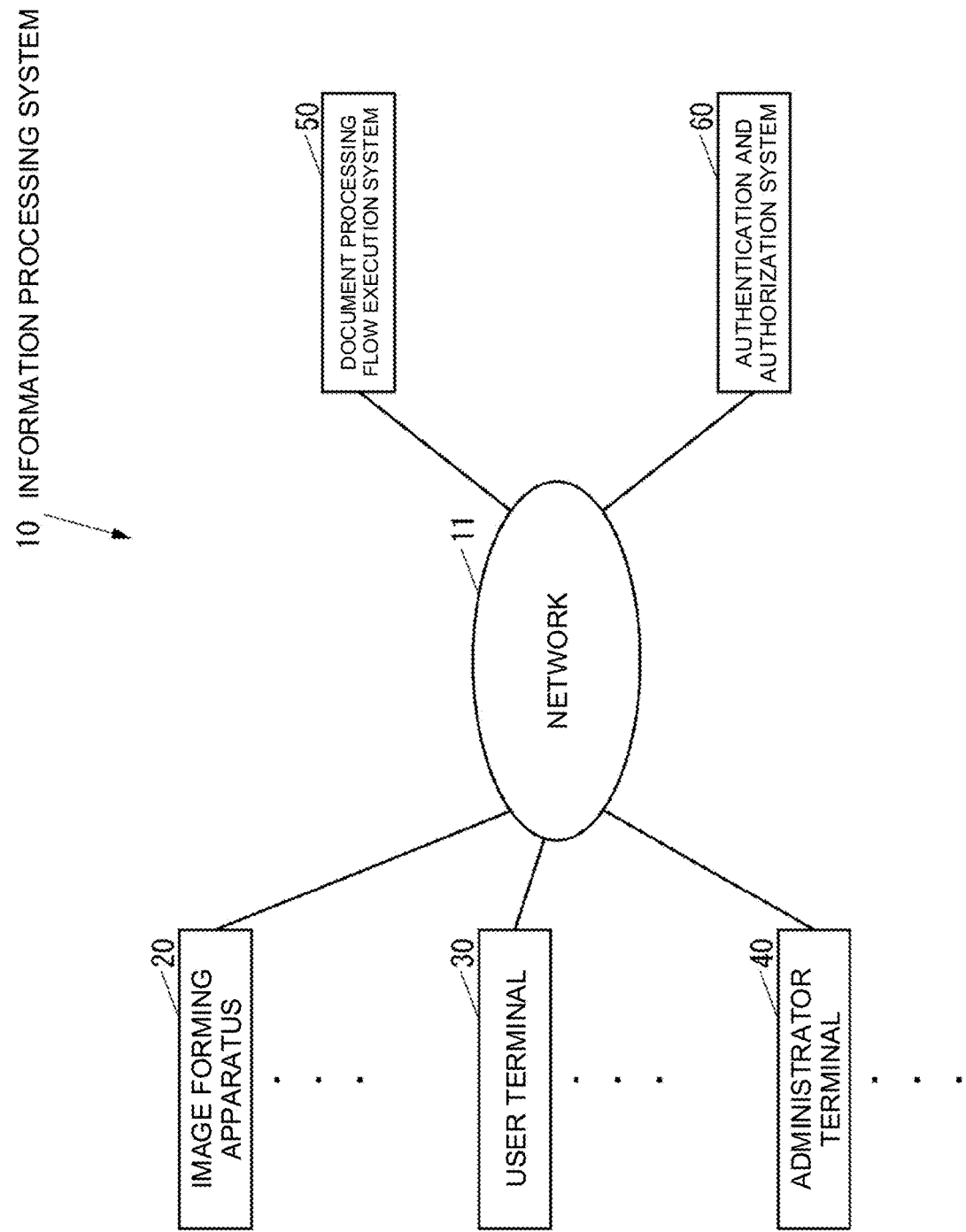
FIG. 3 is a block diagram of an information processing system in an example different from the example shown in FIG. 1.

FIG. 3 is a block diagram of the information processing system 10 in an example different from the example shown in FIG. 1.

As shown in FIG. 3, the information processing system 10 may be configured without the user information holding system 70 (see FIG. 1).

Figure 4:
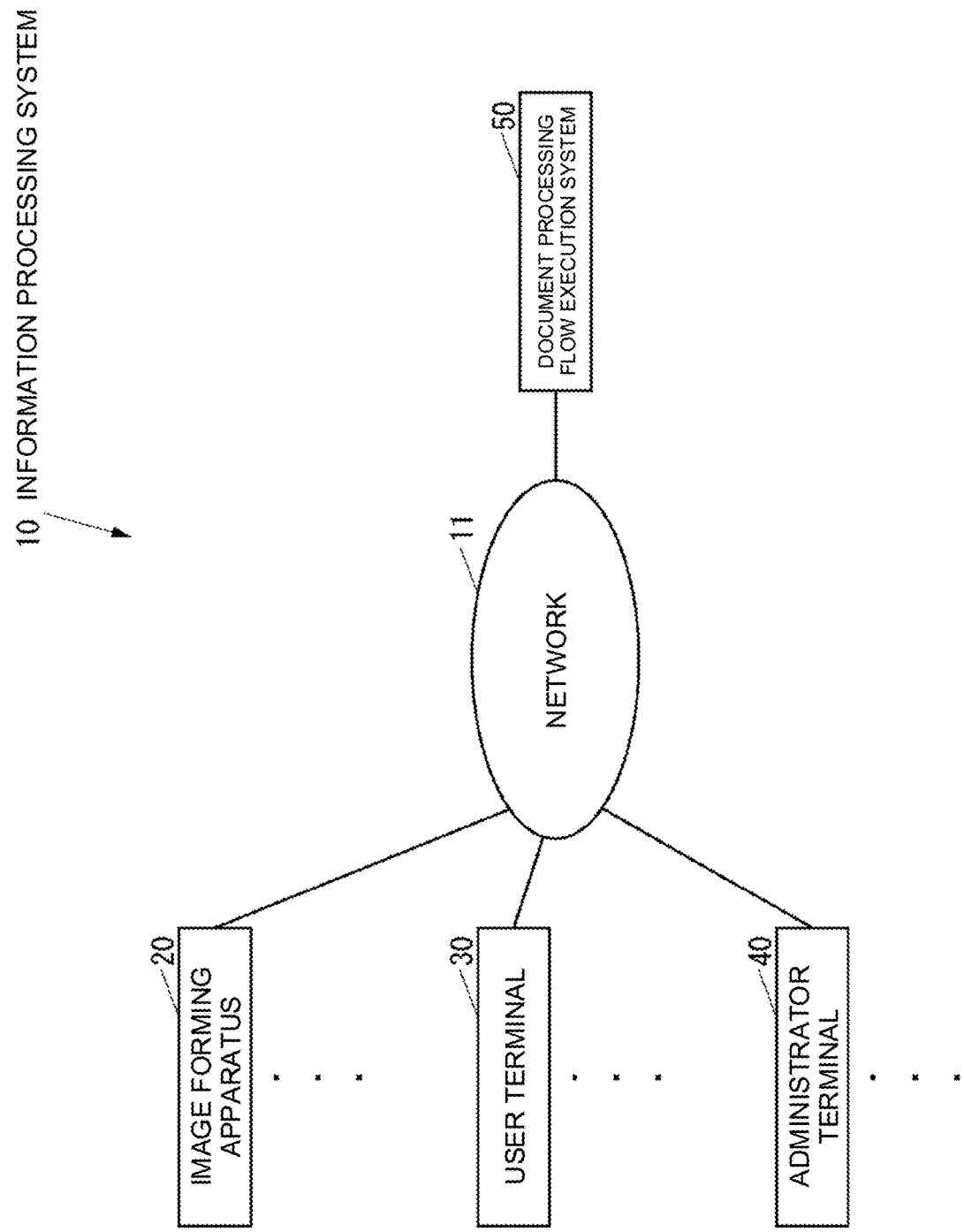
FIG. 4 is a block diagram of an information processing system in an example different from the examples shown in FIGS. 1 and 3.

FIG. 4 is a block diagram of the information processing system 10 in an example different from the examples shown in FIGS. 1 and 3.

As shown in FIG. 4, the information processing system 10 may be configured without the authentication and authorization system 60 (see FIG. 1), and the user information holding system 70 (see FIG. 1).

Figure 5:
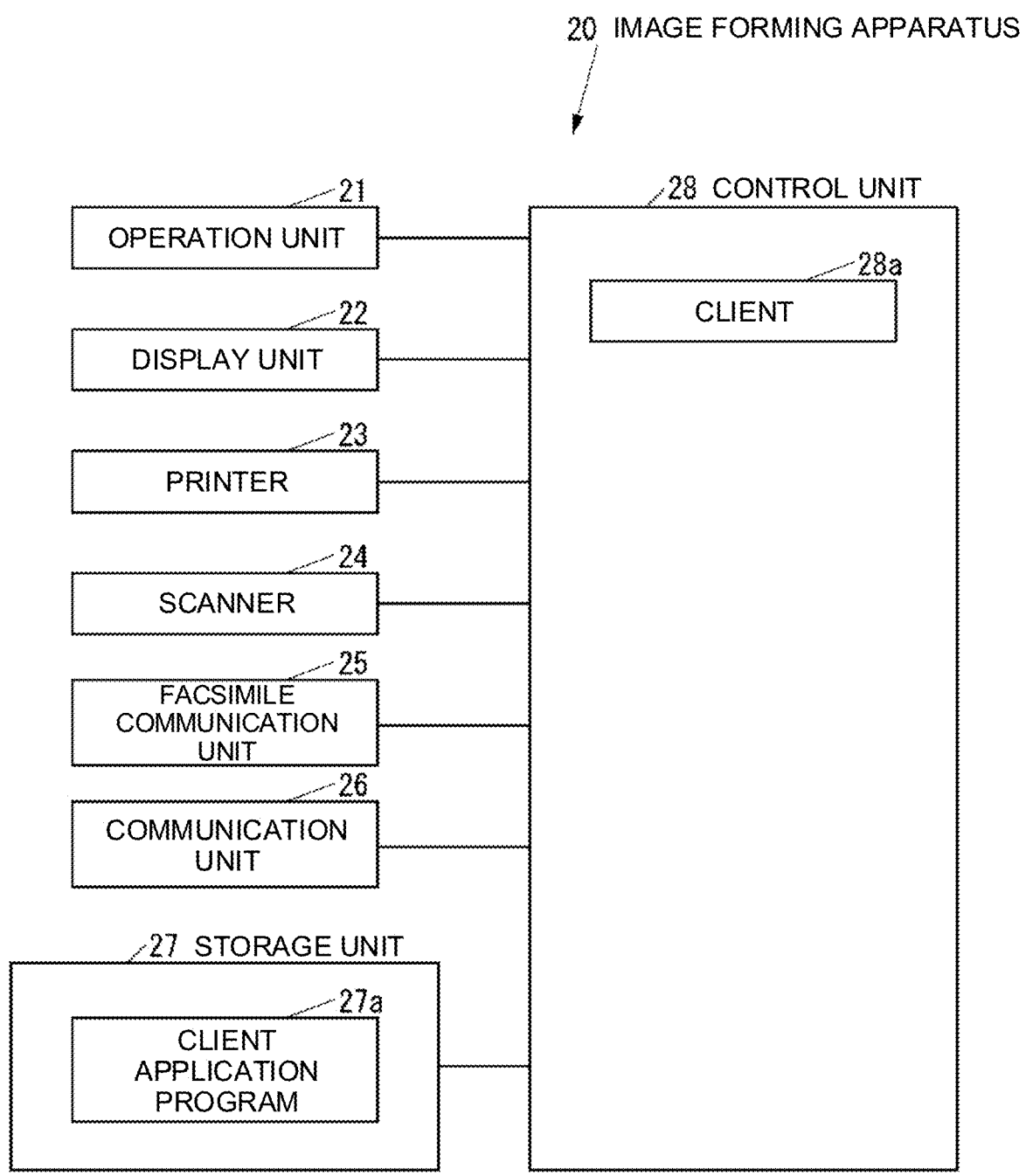
FIG. 5 is a block diagram of an image forming apparatus shown in FIG. 1 when configured by a multifunction peripheral (MFP)

FIG. 5 is a block diagram of the image forming apparatus 20 when configured by the MFP.

As shown in FIG. 5, the image forming apparatus 20 is configured by a computer. The image forming apparatus 20 includes an operation unit 21 which is an input device such as a button for inputting various operations, a display unit 22 which is a display device such as a liquid crystal display (LCD) for displaying various types of information, a printer 23 which is a printing device for printing an image on a recording medium such as a paper sheet, and a scanner 24 which is a reading device for reading an image from a document. The image forming apparatus 20 further includes a facsimile communication unit 25, which is a facsimile device for executing facsimile communication via a communication line such as a public telephone line with an external facsimile apparatus not shown. The image forming apparatus 20 further includes a communication unit 26, which is a communication device for communicating with an external apparatus via a network such as a LAN and the Internet, or directly by wire or wirelessly without using the network. The image forming apparatus 20 further includes a storage unit 27 that is a non-volatile storage device such as a semiconductor memory and a hard disk drive (HDD), which stores various types of information, and a control unit 28 that controls the entire image forming apparatus 20.

The storage unit 27 can store a client application program 27a as an information processing program for providing a user with the functions of the document processing flow execution system 50 (see FIG. 1) and the authentication and authorization system 60 (see FIG. 1). The client application program 27a may be installed in the image forming apparatus 20 at the manufacturing stage of the image forming apparatus 20, additionally installed in the image forming apparatus 20 from an external storage medium such as a universal serial bus (USB) memory, or additionally installed in the image forming apparatus 20 via a network, for example.

The control unit 28 includes, for example, a central processing unit (CPU), a read only memory (ROM) that stores a program and various types of data, and a random access memory (RAM) that is a memory serving as a volatile storage device used as a work area for the CPU in the control unit 28. The CPU in the control unit 28 executes a program stored in the storage unit 27 or the ROM in the control unit 28.

The control unit 28 realizes a client 28a by executing the client application program 27a. The client 28a can restrict the use of various functions of the image forming apparatus 20 such as "scan" for reading an image from a document by the scanner 24, "print output" for printing various images such as an image based on print data received via the communication unit 26 on a recording medium by the printer 23, "copy" for printing an image read from a document by the scanner 24 on a recording medium by the printer 23, and "facsimile transmission" for transmitting an image read from a document by the scanner 24 by facsimile communication by the facsimile communication unit 25, according to authorization information acquired from the authentication and authorization system 60.

Figure 6:
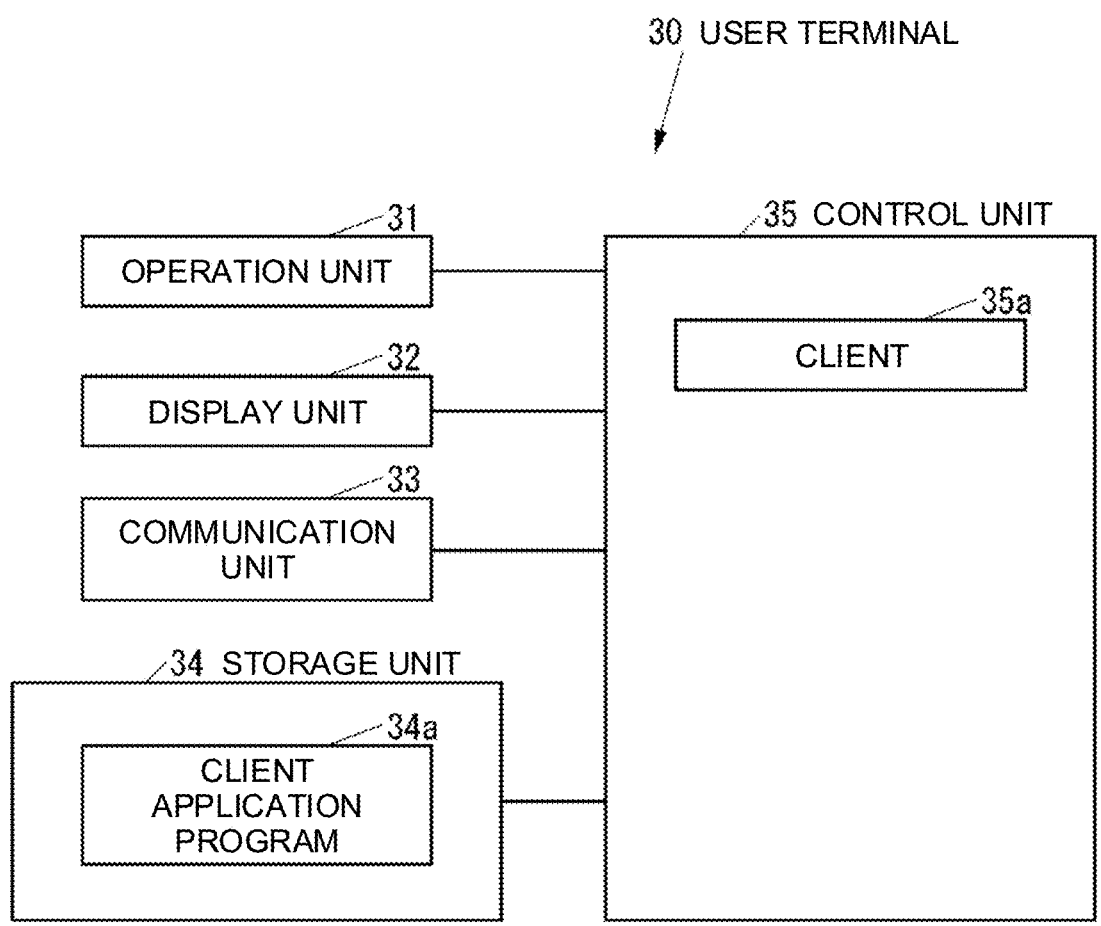
FIG. 6 is a block diagram of a user terminal shown in FIG. 1.

FIG. 6 is a block diagram of the user terminal 30.

As shown in FIG. 6, the user terminal 30 includes an operation unit 31 which is an operation device such as a keyboard and a mouse to which various operations are input, a display unit 32 which is a display device such as an LCD for displaying various types of information, and a communication unit 33 which communicates with an external device via a network such as the Internet or directly by wire or wirelessly without using the network. The user terminal 30 further includes a storage unit 34 which is a non-volatile storage device such as a semiconductor memory and an HDD for storing various types of information, and a control unit 35 which controls the entire user terminal 30.

The storage unit 34 stores a client application program 34a as an information processing program for providing a user with the function of the document processing flow execution system 50 (see FIG. 1). The client application program 34a may be installed in the user terminal 30 at the manufacturing stage of the user terminal 30, additionally installed on the user terminal 30 from an external storage medium such as a compact disk (CD), a digital versatile disk (DVD), and a USB memory, or additionally installed in the user terminal 30 via a network, for example.

The control unit 35 includes, for example, a CPU, a ROM that stores a program and various types of data, and a RAM that is a memory serving as a volatile storage device used as a work area for the CPU in the control unit 35. The CPU in the control unit 35 executes a program stored in the storage unit 34 or the ROM in the control unit 35.

The control unit 35 realizes a client 35a by executing the client application program 34a.

Figure 7:
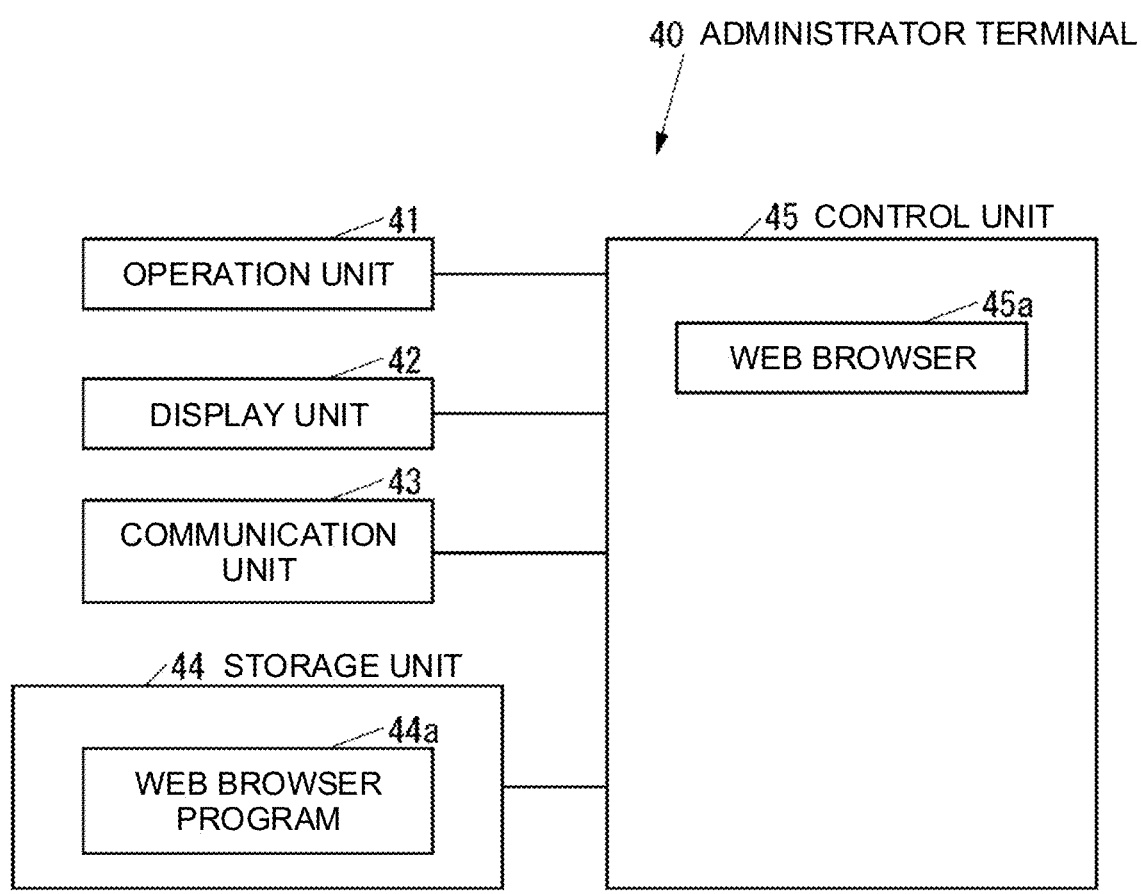
FIG. 7 is a block diagram of an administrator terminal shown in FIG. 1.

FIG. 7 is a block diagram of the administrator terminal 40.

As shown in FIG. 7, the administrator terminal 40 includes an operation unit 41 which is an operation device such as a keyboard and a mouse to which various types of operations are input, a display unit 42 which is a display device such as an LCD for displaying various types of information, a communication unit 43 which is a communication device which communicates with an external device via a network such as a LAN and the Internet, or directly by wire or wirelessly without using the network. The administrator terminal 40 further includes a storage unit 44 which is a non-volatile storage device such as a semiconductor memory and an HDD for storing various types of information, and a control unit 45 for controlling the entire administrator terminal 40.

The storage unit 44 stores a web browser program 44a which is a program for a web browser. The web browser program 44a may be installed in the administrator terminal 40 at the manufacturing stage of the administrator terminal 40, additionally installed in the administrator terminal 40 from an external storage medium such as a CD, a DVD, and a USB memory, or additionally installed in the administrator terminal 40 via a network, for example.

The control unit 45 includes, for example, a CPU, a ROM that stores a program and various types of data, and a RAM that is a memory serving as a volatile storage device used as a work area for the CPU in the control unit 45. The CPU in the control unit 45 executes a program stored in the storage unit 44 or the ROM in the control unit 45.

The control unit 45 realizes a web browser 45a by executing the web browser program 44a.

Figure 8:
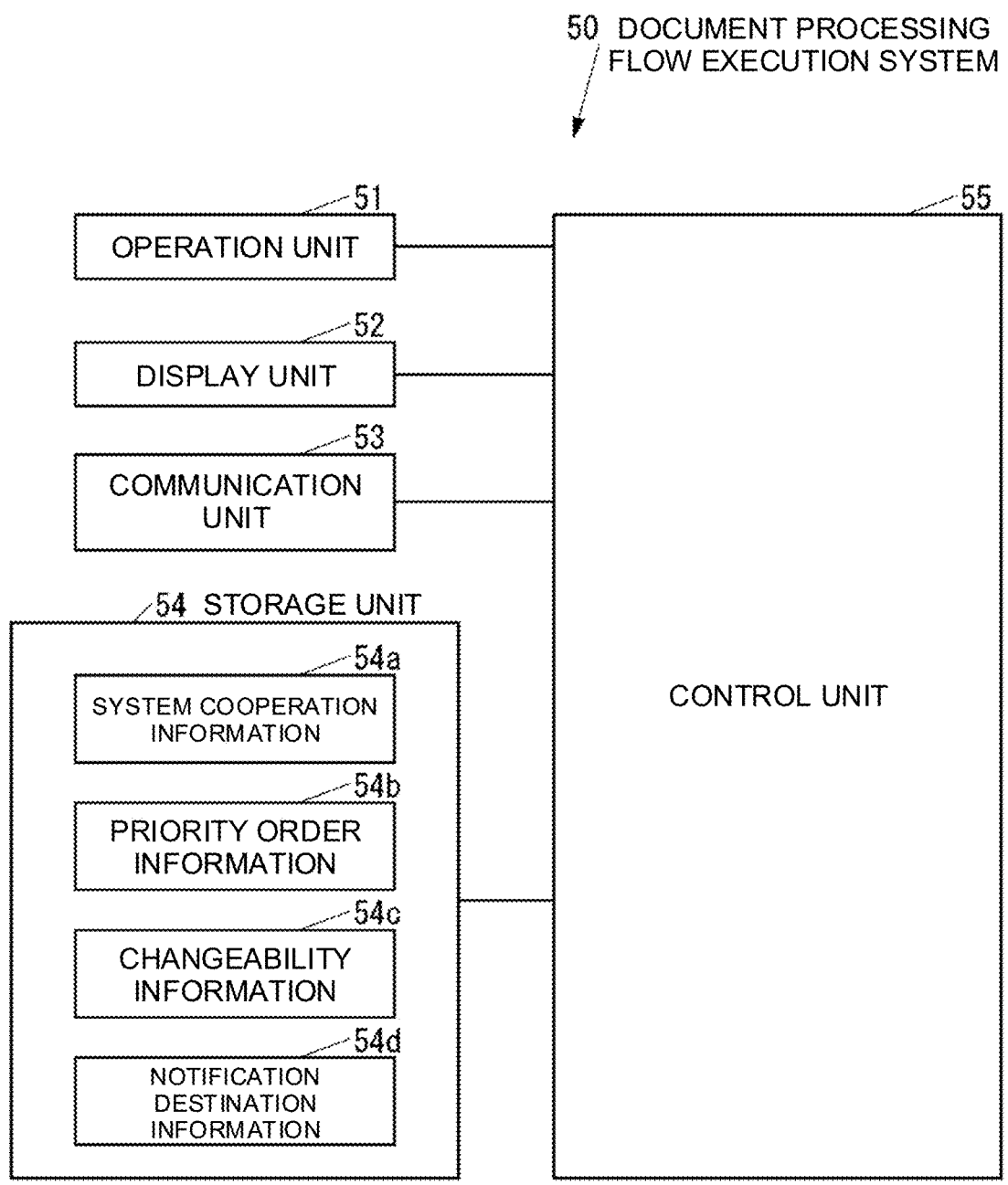
FIG. 8 is a block diagram showing the document processing flow execution system shown in FIG. 1 when configured by one computer.

FIG. 8 is a block diagram of the document processing flow execution system 50 when configured by one computer.

As shown in FIG. 8, the document processing flow execution system 50 includes an operation unit 51 which is an operation device such as a keyboard and a mouse to which various operations are input, a display unit 52 which is a display device such as an LCD for displaying various types of information, a communication unit 53 which is a communication device which communicates with an external device via a network such as a LAN and the Internet or directly by wire or wirelessly without using the network. The document processing flow execution system 50 further includes a storage unit 54 that is a non-volatile storage device such as a semiconductor memory and an HDD for storing various types of information, and a control unit 55 that controls the entire document processing flow execution system 50.

The storage unit 54 stores system cooperation information 54a as information for cooperating with a system other than the document processing flow execution system 50, such as the authentication and authorization system 60 (see FIG. 1) and the user information holding system 70 (see FIG. 1).

The storage unit 54 stores priority order information 54b indicating the priority order of the system regarding each of the various types of information in the systems included in the information processing system 10. The content of the priority order information 54*b* may be fixed, or may be changed via, for example, the administrator terminal. For example, an administrator can access the document processing flow execution system 50 from the administrator terminal 40 via the web browser 45*a*, and set the priority order information 54*b*.

FIG. 9 is a diagram showing an example of the priority order information 54*b*.

In the priority order information 54*b* shown in FIG. 9, the system with the smaller numerical value preferentially becomes the master system. When the document processing flow execution system 50 cooperates with the user information holding system 70 as shown in FIG. 1 in the username, for example, the user information holding system 70 becomes the master system. Also, when the document processing flow execution system 50 cooperates with the authentication and authorization system 60 without cooperating with the user information holding system 70 as shown in FIG. 3, the authentication and authorization system 60 becomes the master system. Further, when the document processing flow execution system 50 does not cooperate with any of the authentication and authorization system 60 and the user information holding system 70 as shown in FIG. 4, the document processing flow execution system 50 becomes the master system.

As shown in FIG. 8, the storage unit 54 stores changeability information 54*c* indicating whether the change regarding each of various types of information is possible.

FIG. 10 is a diagram showing an example of the changeability information 54*c*.

The changeability information 54*c* shown in FIG. 10 sets that a user cannot change the username, the password, and the email address, and can change the language, the PIN code, and the folder information.

As shown in FIG. 8, the storage unit 54 stores notification destination information 54*d* indicating a notification destination for the change relating to each of the various types of information.

FIG. 11 is a diagram showing an example of the notification destination information 54*d*.

As shown in FIG. 11, the notification destination information 54*d* sets the master system and the slave system as the notification destination. In the notification destination information 54*d* shown in FIG. 11, the username, the password, and the email address set that there is no system applicable to any of the master system and the slave system. Further, the language and the PIN code set that the master system is the authentication and authorization system 60 and the slave system is the document processing flow execution system 50. Further, the folder information sets that the master system is the document processing flow execution system 50 and there is no system applicable to the slave system.

The control unit 55 in FIG. 8 includes, for example, a CPU, a ROM that stores a program and various types of data, and a RAM as a memory used as a work area for the CPU in the control unit 55. The CPU in the control unit 55 executes a program stored in the storage unit 54 or the ROM in the control unit 55.

Next, the operation of the information processing system 10 will be described.

First, the operation of the document processing flow execution system 50 in cooperating with another system will be described.

Figure 13:
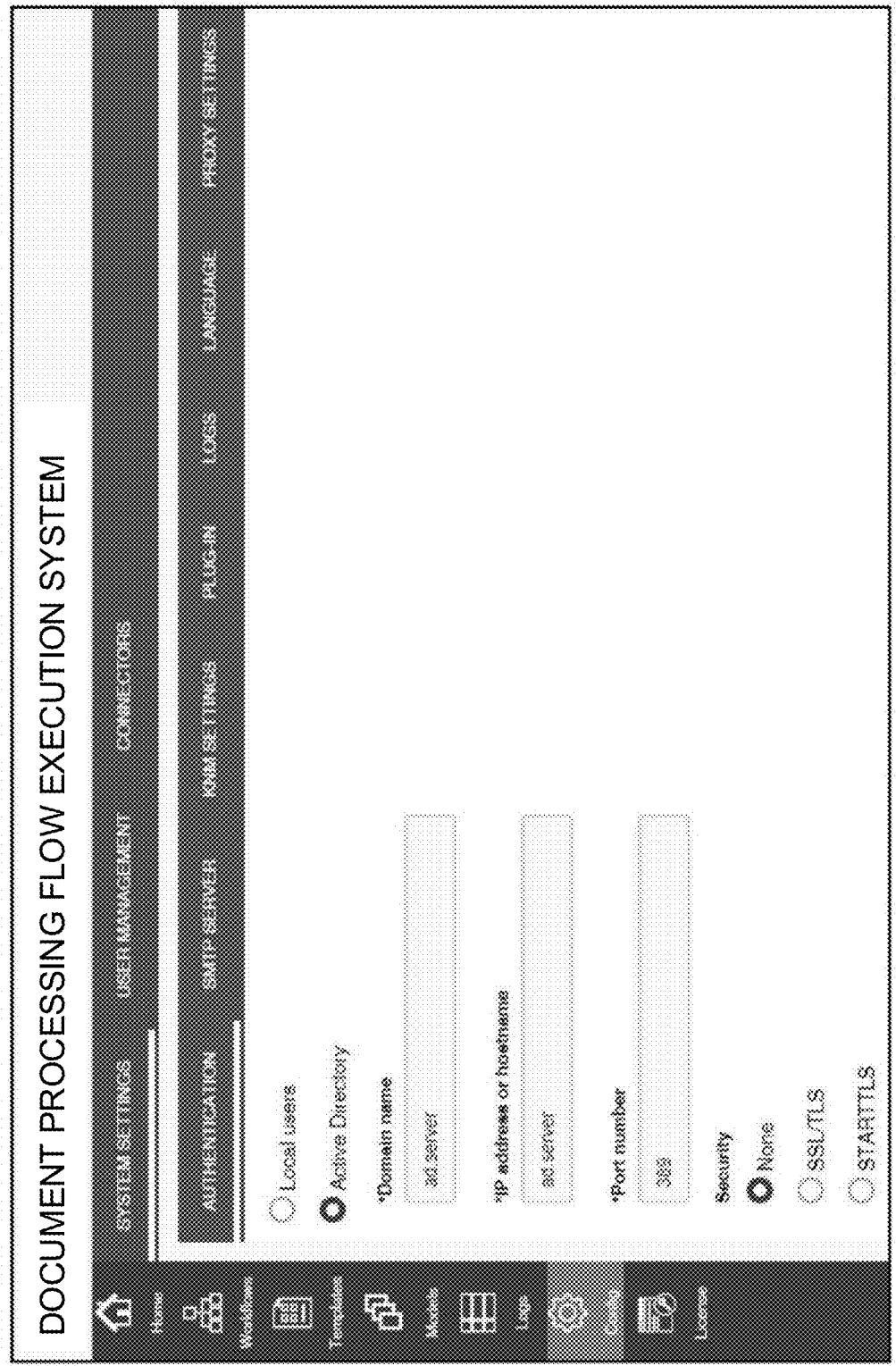
FIG. 13 is a diagram showing an example of a screen displayed on a display unit in the administrator terminal in the operation shown in FIG. 12.

FIG. 12 is a flowchart showing the operation of the document processing flow execution system 50 when cooperating with another system. FIG. 13 is a diagram showing an example of a screen displayed on the display unit 42 in the administrator terminal 40 in the operation shown in FIG. 12.

An administrator can access the document processing flow execution system 50 from the administrator terminal 40 via the web browser 45*a*, for example, and instruct the document processing flow execution system 50 to start setting the user information holding system 70 to the document processing flow execution system 50. When the administrator instructs to start setting the user information holding system 70, the control unit 55 in the document processing flow execution system 50 executes the operation shown in FIG. 12.

As shown in FIG. 12, the control unit 55 transmits data for the setting screen (see FIG. 13) of the user information holding system 70 to the administrator terminal 40 (S101). Therefore, the control unit 45 in the administrator terminal 40 displays the screen shown in FIG. 13 on the display unit 42. It is possible to input information for setting the user information holding system 70, and instruct to save the input information in the document processing flow execution system 50 on the screen shown in FIG. 13.

After the processing of S101, the control unit 55 determines whether an instruction to save information for setting the user information holding system 70 has been issued until the control unit 55 determines that the instruction to save information for setting the user information holding system 70 has been issued (S102).

When the control unit 55 determines in S102 that an instruction to save information for setting the user information holding system 70 has been issued, the control unit 55 saves the information determined in S102, for which the instruction to save the information has been issued, in the system cooperation information 54*a* (S103), and then ends the operation shown in FIG. 12.

The operation of the document processing flow execution system 50 when cooperating with the user information holding system 70 has been described above. However, the operation of the document processing flow execution system 50 when cooperating with the authentication and authorization system 60 is also the same as the operation.

Next, the operation of the document processing flow execution system 50 when generating the changeability information 54*c* will be described.

Figure 14:
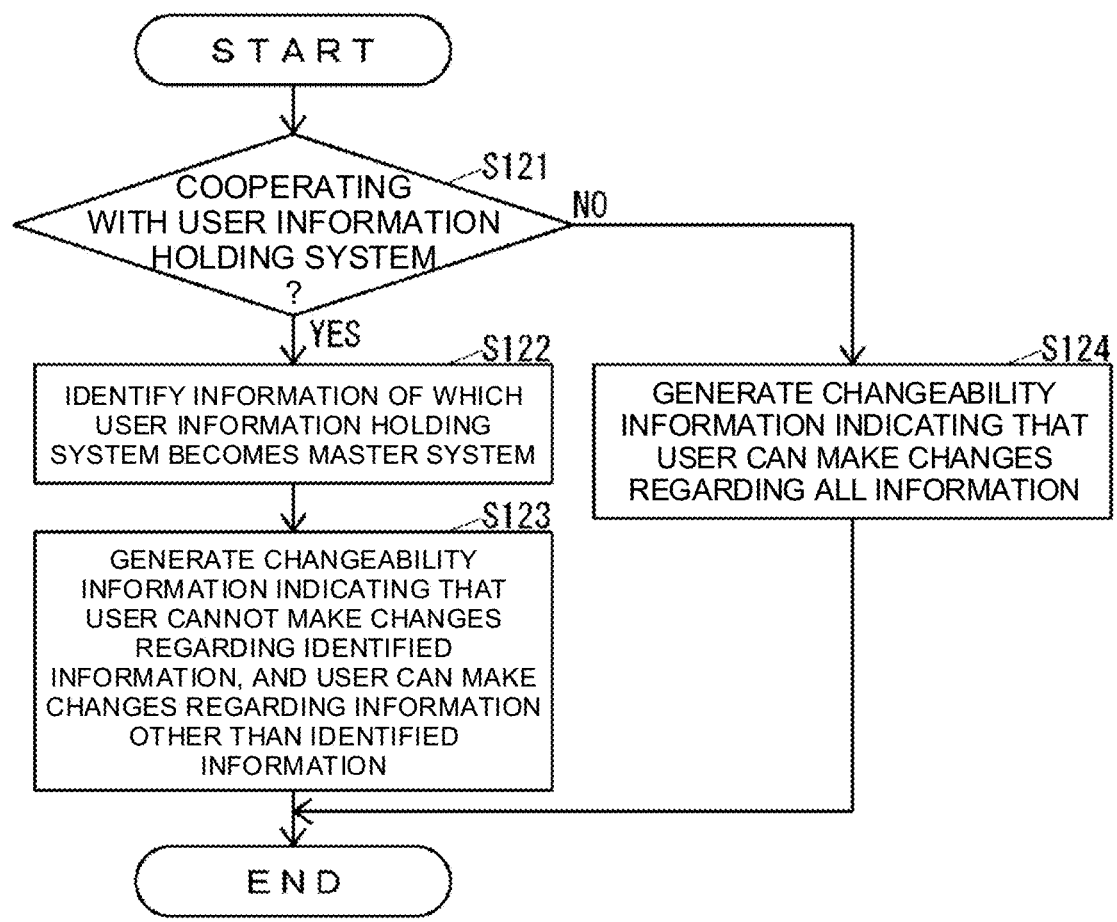
FIG. 14 is a flowchart showing the operation of the document processing flow execution system shown in FIG. 8 when generating the changeability information.

When the system cooperation information 54*a* and the priority order information 54*b* are read for the first time, and when either the system cooperation information 54*a* or the priority order information 54*b* is updated, the control unit 55 in the document processing flow execution system 50 executes the operation shown in FIG. 14.

FIG. 14 is a flowchart showing the operation of the document processing flow execution system 50 when generating the changeability information 54*c*.

As shown in FIG. 14, the control unit 55 determines whether the document processing flow execution system 50 cooperates with the user information holding system 70, based on the system cooperation information Ma (S121).

When the control unit 55 determines in S121 that the document processing flow execution system 50 cooperates with the user information holding system 70, the control unit 55 identifies the information of which the user information holding system 70 becomes the master system, based on the system cooperation information 54*a* and the priority order information 54*b* (S122).

Next, the control unit 55 generates the changeability information 54*c* indicating that the user cannot make changes regarding the information identified in S122, and can make changes regarding information other than the information identified in S122 (S123), and then ends the operation shown in FIG. 14.

When the control unit 55 determines in S121 that the document processing flow execution system 50 does not cooperate with the user information holding system 70, the control unit 55 generates the changeability information 54c indicating that the user can make changes regarding all the information (S124), and then ends the operation shown in FIG. 14.

Note that, in the above, the changeability information 54c is automatically generated by the document processing flow execution system 50. However, the changeability information 54c may be set by the administrator without being automatically generated by the document processing flow execution system 50. For example, the administrator can access the document processing flow execution system 50 from the administrator terminal 40 via, for example, the web browser 45a, and set the changeability information 54c.

Next, the operation of the document processing flow execution system 50 when generating the notification destination information 54d will be described.

Figure 15:
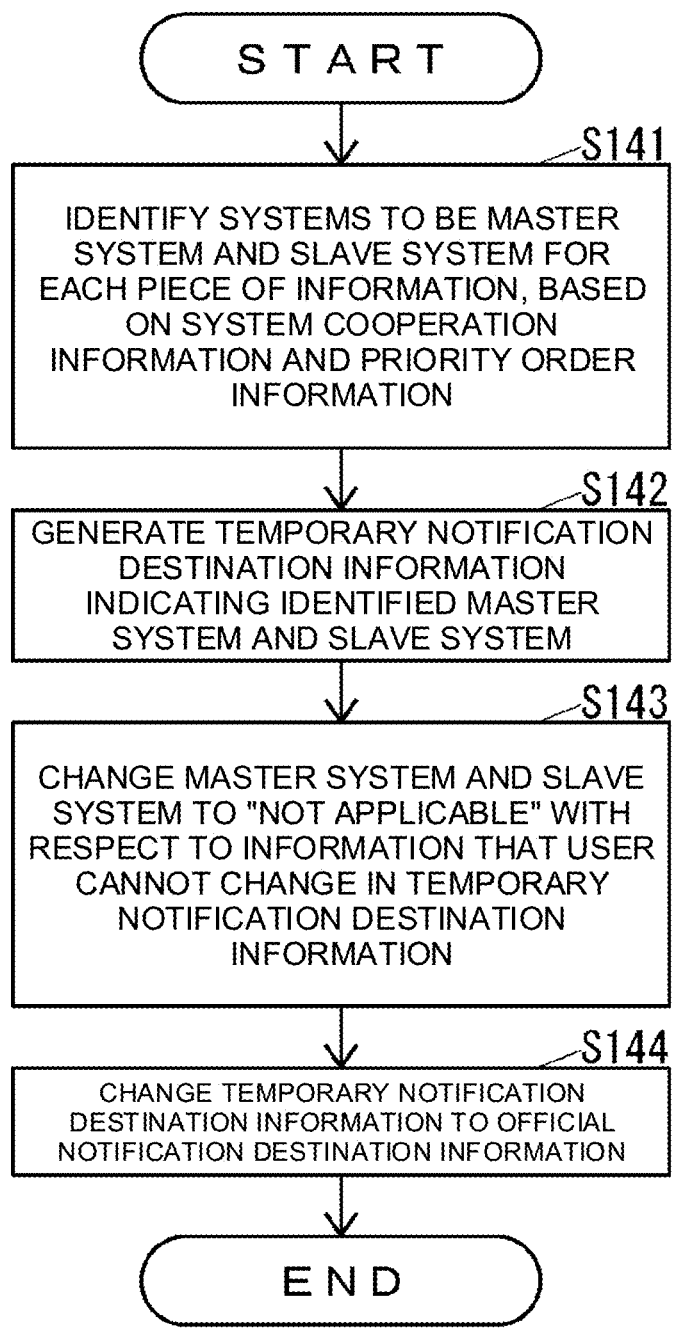
FIG. 15 is a flowchart showing the operation of the document processing flow execution system shown in FIG. 8 when generating the notification destination information.

When the system cooperation information 54a, the priority order information 54b, and the changeability information 54c are read for the first time, and when any one of the system cooperation information 54a, the priority order information 54b, and the changeability information 54c is updated, the control unit 55 in the document processing flow execution system 50 executes the operation shown in FIG. 15.

FIG. 15 is a flowchart showing the operation of the document processing flow execution system 50 when generating the notification destination information 54d.

As shown in FIG. 15, the control unit 55 identifies systems to be the master system and the slave system for each piece of information, based on the system cooperation information Ma and the priority order information 54b (S141). Here, the control unit 55 sets the slave system to "not applicable" for the information that the document processing flow execution system 50 becomes the master system.

Next, the control unit 55 generates temporary notification destination information indicating the master system and the slave system identified in S141 for each piece of information (S142).

Next, the control unit 55 changes the master system and the slave system to "not applicable" with respect to the information indicated by the changeability information 54c that the user cannot change, in the temporary notification destination information generated in S142 (S143).

Next, the control unit 55 changes the temporary notification destination information to the official notification destination information 54d (S144), and then ends the operation shown in FIG. 15.

Next, the operation of the information processing system 10 when a user logs in to the document processing flow execution system 50 using her/his username and password when the information processing system 10 has the configuration shown in FIG. 1 will be described.

Figure 16:
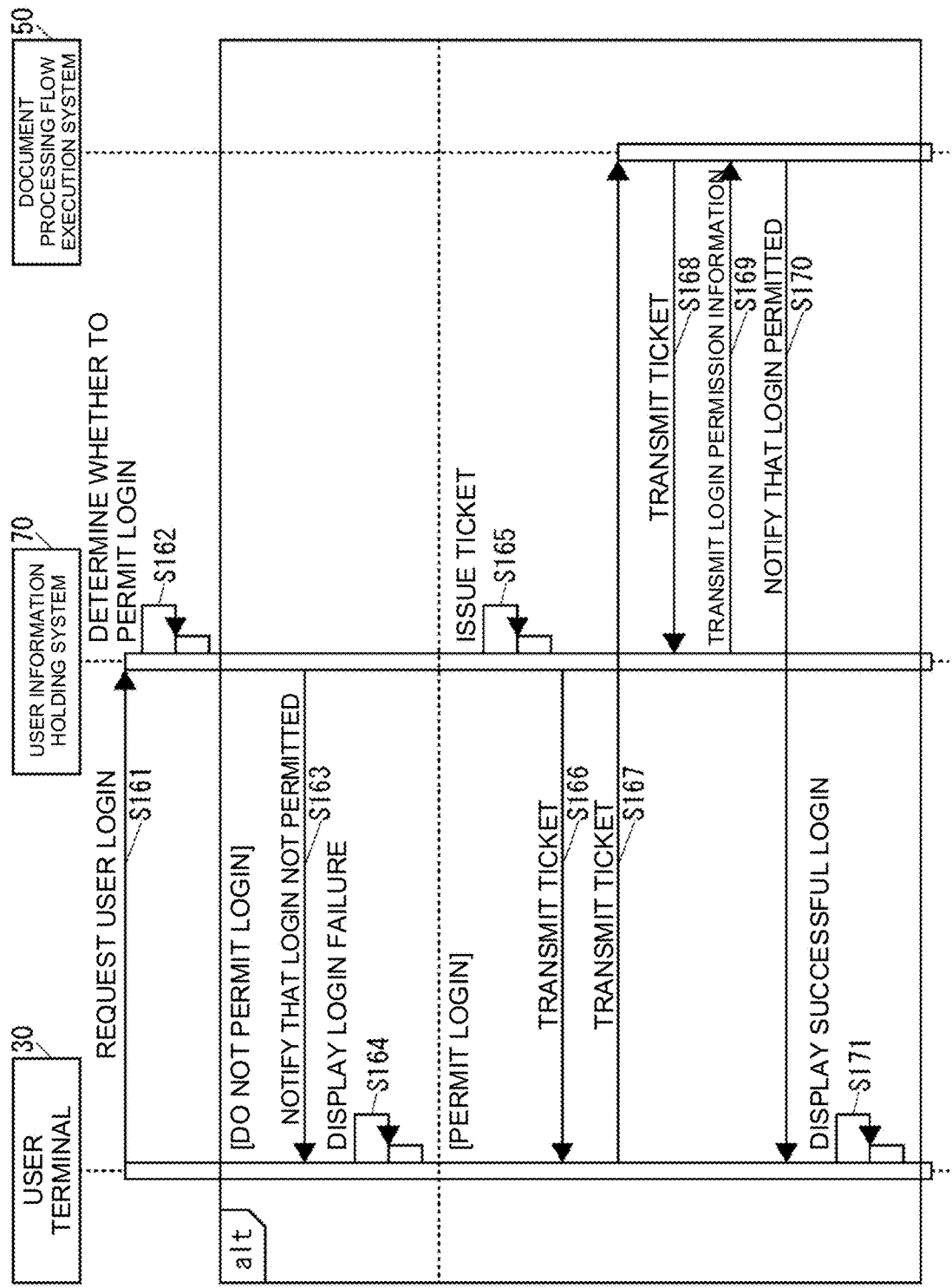
FIG. 16 is a sequence diagram showing the operation of the information processing system when a user logs in to the document processing flow execution system using her/his username and password when the information processing system has the configuration shown in FIG. 1.

FIG. 16 is a sequence diagram showing the operation of the information processing system 10 when a user logs in to the document processing flow execution system 50 using her/his username and password when the information processing system 10 has the configuration shown in FIG. 1.

As shown in FIG. 16, since the document processing flow execution system 50 cooperates with the user information holding system 70, the control unit 35 in the user terminal 30 sends a request to the user information holding system 70 for a user login (S161). This request includes her/his username and password input by the user via the operation unit 31. Note that, for example, the control unit 35 inquires of the document processing flow execution system 50 whether the document processing flow execution system 50 cooperates with the user information holding system 70, so that the control unit 35 can recognize that the document processing flow execution system 50 cooperates with the user information holding system 70.

When the user information holding system 70 receives the request in S161, the user information holding system 70 determines whether to permit the user to log in (S162). Here, when the combinations of the user name and the password held by the user information holding system 70 itself include the combination of the user name and the password included in the request in S161, that is, when the user authentication is successful, the user information holding system 70 determines to permit the user to log in. On the other hand, when the combinations of the user name and the password held by the user information holding system 70 itself does not include the combination of the user name and the password included in the request in S161, that is, when the user authentication is unsuccessful, the user information holding system 70 determines not to permit the user to log in.

When the user information holding system 70 determines in S162 that the user is not permitted to log in, the user information holding system 70 notifies the user terminal 30 that the user is not permitted to log in (S163).

Therefore, the control unit 35 in the user terminal 30 displays the login failure to the document processing flow execution system 50 on the display unit 32 (S164), and then ends the operation shown in FIG. 16.

On the other hand, when the user information holding system 70 determines in S162 to permit the user to log in, the user information holding system 70 issues a ticket indicating that the user information holding system 70 permits the user to log in (S165), and then transmits the ticket issued in S165 to the user terminal 30 (S166).

When the control unit 35 in the user terminal 30 receives the ticket transmitted in S166, the control unit 35 transmits the received ticket to the document processing flow execution system 50 (S167).

When the control unit 55 in the document processing flow execution system 50 receives the ticket transmitted in S167, the control unit 55 transmits the received ticket to the user information holding system 70 (S168).

When the user information holding system 70 receives the ticket transmitted in S168, the user information holding system 70 transmits login permission information indicating that the user corresponding to the received ticket is permitted to log in to the document processing flow execution system 50 (S169). Here, the login permission information may include various types of information of the user corresponding to the ticket, such as the user's email address and belonging group.

When the control unit 55 in the document processing flow execution system 50 receives the login permission information transmitted in S169, the control unit 55 notifies the user terminal 30 that the user is permitted to log in (S170).

Therefore, the control unit 35 in the user terminal 30 displays the successful login to the document processing flow execution system 50 on the display unit 32 (S171), and then ends the operation shown in FIG. 16.

In the case where the information processing system 10 has the configuration shown in FIG. 1, the operation of the information processing system 10 when the user logs in to the document processing flow execution system 50 using her/his username and password has been described above. However, in the case where the information processing system 10 has the configuration shown in FIG. 1, the operation of the information processing system 10 when the user logs in to the authentication and authorization system 60 using her/his username and password is also the same as the operation, except that the document processing flow execution system 50 is changed to the authentication and authorization system 60, in the operation shown in FIG. 16.

Note that, in the case where the information processing system 10 has already logged in to one of the document processing flow execution system 50 and the authentication and authorization system 60, when the information processing system 10 logs in to the other of the document processing flow execution system 50 and the authentication and authorization system 60, the control unit 35 in the user terminal 30 reuses the ticket already acquired from the user information holding system 70. Therefore, the control unit 35 in the user terminal 30 does not need to newly acquire the ticket from the user information holding system 70. That is, the information processing system 10 realizes a single sign-on.

In the case where the information processing system 10 has the configuration shown in FIG. 1, the operation of the information processing system 10 when the user logs in to the document processing flow execution system 50 or the authentication and authorization system 60 using her/his username and password is described above. However, in the case where the information processing system 10 has the configuration shown in FIG. 3, the operation of the information processing system 10 when the user logs in to the document processing flow execution system 50 or the authentication and authorization system 60 using her/his username and password is the same as the operation, except that the user information holding system 70 is changed to the authentication and authorization system 60. That is, the authentication and authorization system 60 uses the combination of her/his username and password held by the authentication and authorization system 60 itself to execute the authentication of the user, and issue the ticket.

Note that, in the case that the information processing system 10 has the configuration shown in FIG. 4, when the user logs in to the document processing flow execution system 50 using her/his username and password, the document processing flow execution system 50 executes the authentication of the user using the combination of her/his username and password held by the document processing flow execution system 50 itself.

The operation of the information processing system 10 when the user logs in to the document processing flow execution system 50 or the authentication and authorization system 60 using her/his username and password has been described above. However, the operation of the information processing system 10 when the user logs in to the document processing flow execution system 50 or the authentication and authorization system 60 from the image forming apparatus 20 using her/his PIN code is the same as the operation, except that the user terminal 30 is changed to the image forming apparatus 20. However, when the user logs in to the document processing flow execution system 50 or the authentication and authorization system 60 from the image forming apparatus 20 using her/his PIN code, the user information holding system 70 does not participate in the operation.

Next, the operation of the information processing system 10 when changing the information held by each system will be described.

Figure 17:
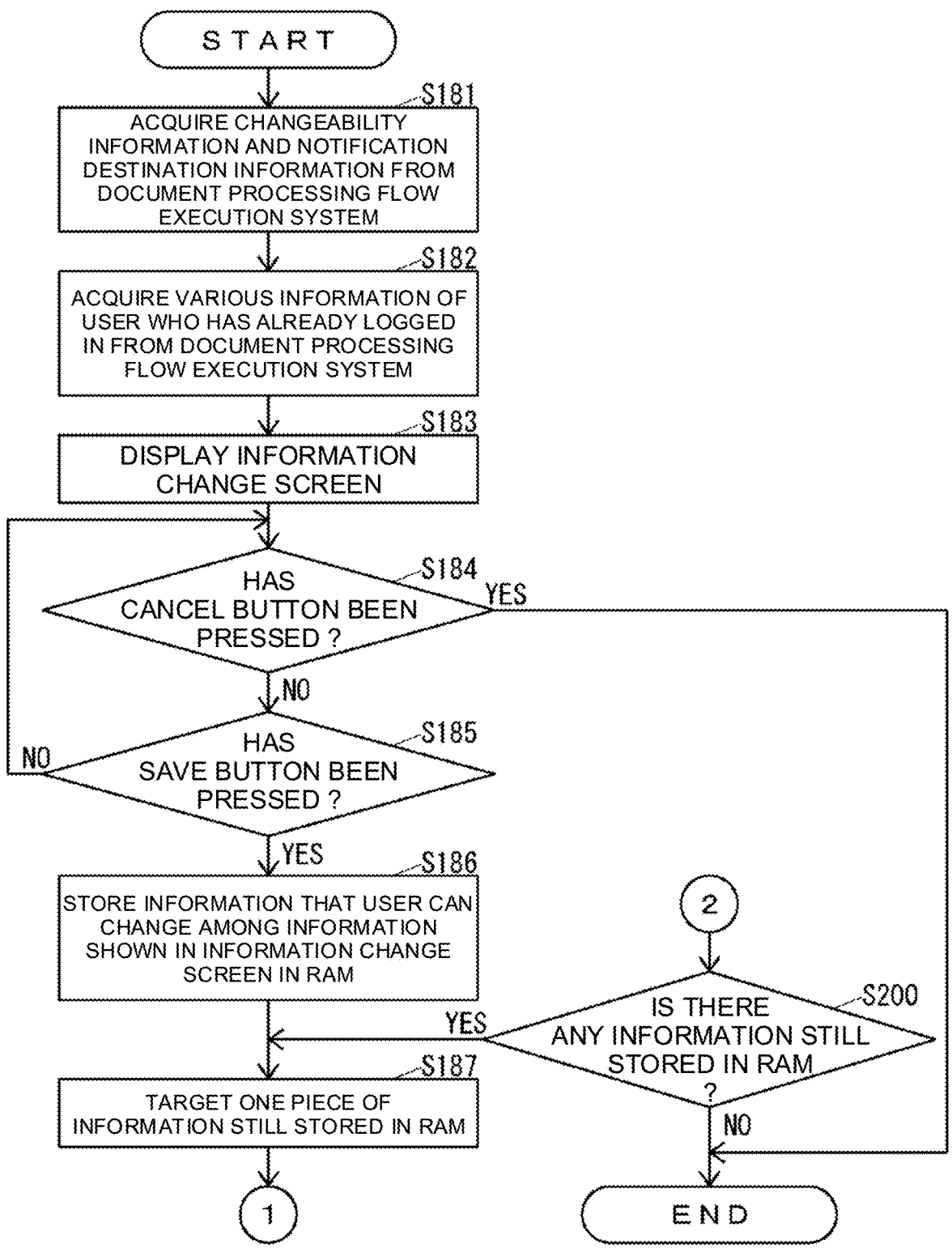
FIG. 17 is a flowchart showing a part of the operation of the image forming apparatus shown in FIG. 5 when changing the information held by each system.
Figure 18:
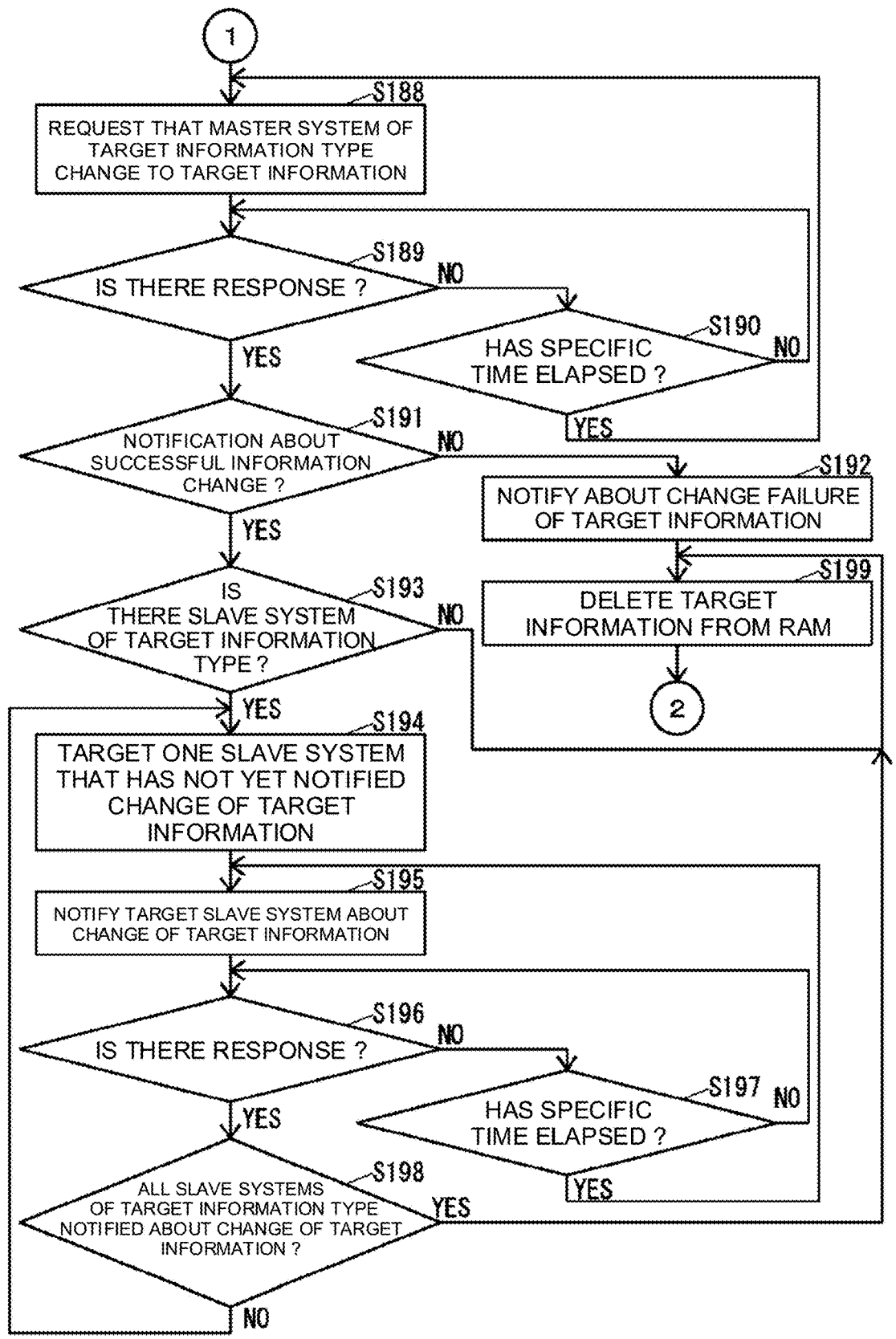
FIG. 18 is a flowchart showing an operation subsequent to the operation shown in FIG. 17.

FIGS. 17 and 18 are a flowchart showing the operation of the image forming apparatus 20 when changing the information held by each system.

When the start of the operation for changing the information held by each system is instructed via the operation unit 21, the control unit 28 in the image forming apparatus 20 executes the operation shown in FIGS. 17 and 18.

As shown in FIGS. 17 and 18, the client 28a in the image forming apparatus 20 acquires the changeability information 54c and the notification destination information 54d from the document processing flow execution system 50 (S181).

Next, the client 28a acquires, from the document processing flow execution system 50, various information shown by the changeability information 54c and the notification destination information 54d of the user who has already logged in to the document processing flow execution system 50 from the image forming apparatus 20 (hereinafter referred to as "target user") (S182).

Next, the client 28a displays an information change screen 80 (see FIG. 19) for changing the information on the display unit 22 (S183).

Figure 19:
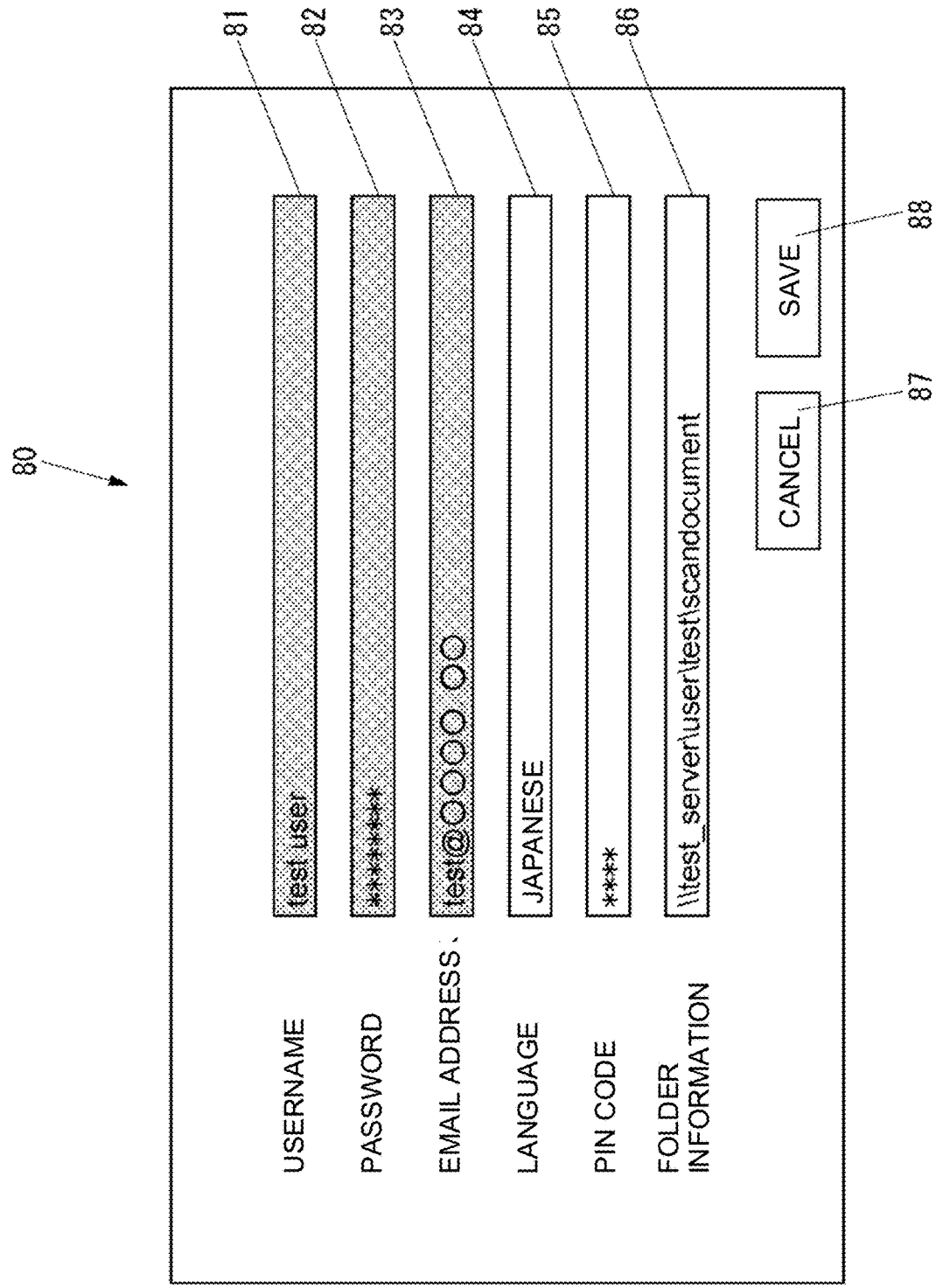
FIG. 19 is a diagram showing an example of an information change screen displayed on the display unit in the image forming apparatus in the operation shown in FIGS. 17 and 18.

FIG. 19 is a diagram showing an example of the information change screen 80 displayed on the display unit 22 in the image forming apparatus 20, in the operation shown in FIGS. 17 and 18.

The information change screen 80 shown in FIG. 19 includes a text box 81 showing a user name, a text box 82 showing a password, a text box 83 showing an email address, a text box 84 showing a language, a text box 85 showing a PIN code, a text box 86 showing a folder information, a cancel button 87 for canceling the change of information, and a save button 88 for executing the change of information.

When the client 28a displays the information change screen 80 on the display unit 22 in S183, the client 28a inputs the information acquired in S182 into each of the text boxes 81 to 86.

The client 28a grays out the text box corresponding to the information indicated by the changeability information Mc acquired in S181 that the user cannot change among the text boxes 81 to 86, to prevent the user from changing. According to the example shown in FIG. 19, the text boxes 81 to 83 are grayed out.

In the example shown in FIG. 19, the text box corresponding to the information indicated by the changeability information Mc acquired in S181 that the user cannot change is grayed out. However, the client 28a does not have to include, on the information change screen 80, a text box corresponding to the information indicated by the changeability information Mc acquired in S181 that the user cannot change, and the item name of the text box.

In the example shown in FIG. 19, a text box is also used as a widget for the item of the language. However, the client 28a may use a widget suitable for selecting from a predetermined value such as a pull-down menu, a radio button, and a check box, for information selected from a predetermined value such as a language.

In the example shown in FIG. 19, a text box is also used as a widget for the item of the folder information. However, the client 28a may use a tree view as a widget for information that specifies a specific location in the tree structure such as folder information.

As shown in FIGS. 17 and 18, the client 28a determines whether the cancel button 87 has been pressed after the processing of S183 (S184).

When the client 28a determines in S184 that the cancel button 87 has been pressed, the client 28a ends the operation shown in FIGS. 17 and 18.

When the client 28a determines in S184 that the cancel button 87 has not been pressed, the client 28a determines whether the save button 88 has been pressed (S185).

When the client 28a determines in S185 that the save button 88 has not been pressed, the client 28a executes the processing of S184.

When the client 28a determines in S185 that the save button 88 has been pressed, the client 28a stores, in the RAM in the control unit 28, the information indicated by the changeability information 54c acquired in S181 that the user can change among the information shown in the information change screen 80 (S186).

Next, the client 28a targets one piece of information still stored in the RAM among the information stored in the RAM in S186 (S187).

Next, regarding the type of information for a target (hereinafter referred to as "target information") (hereinafter referred to as "target information type"), the client 28a requests that the master system indicated by the notification destination information 54d acquired in S181 change the target information (S188).

Figure 20:
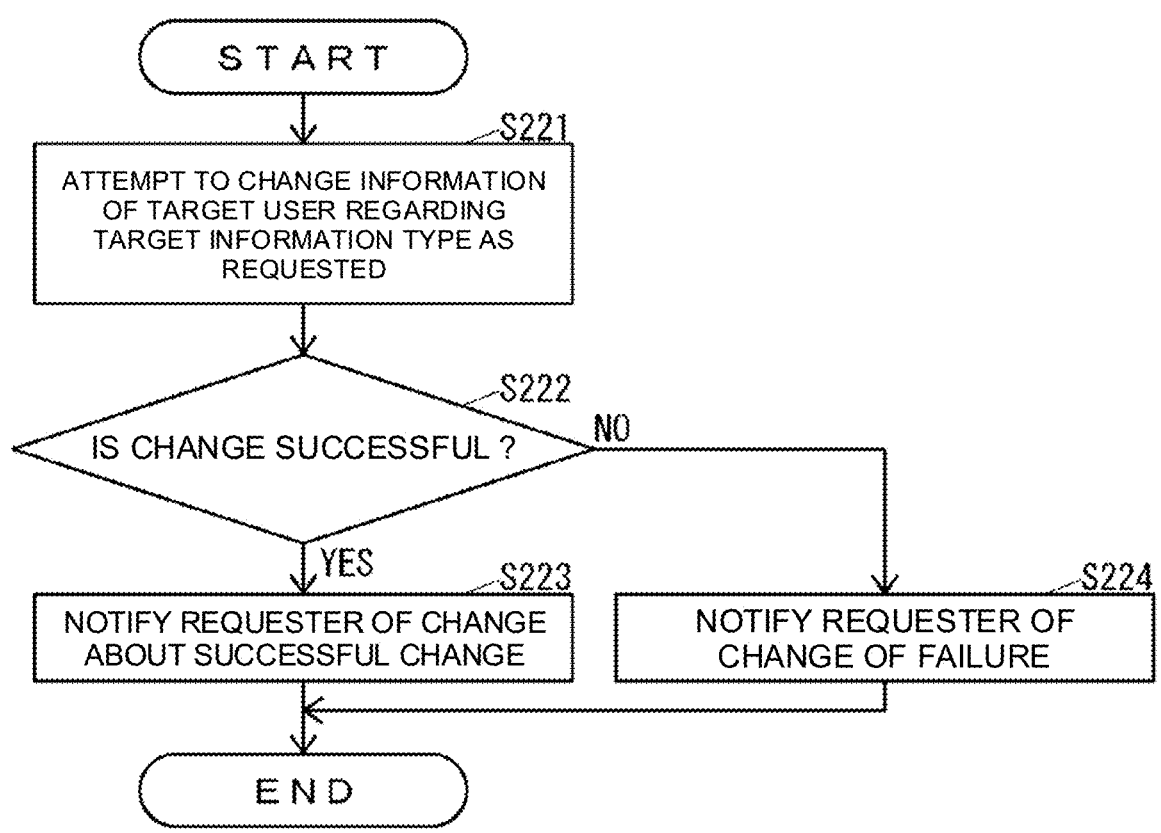
FIG. 20 is a flowchart showing the operation of the master system when a change to target information is requested in the operation shown in FIGS. 17 and 18.

FIG. 20 is a flowchart showing the operation of the master system when the change of the target information is requested in the operation shown in FIGS. 17 and 18.

As shown in FIG. 20, when requested that the target information be changed, the master system attempts to change the information of the target user regarding the target information type among the information held by the master system itself as requested (S221).

Next, the master system determines whether the change in S221 is successful (S222).

When the master system determines in S222 that the change in S221 is successful, the master system notifies the requester about the change to the target information of the successful change to the target information (S223), and then ends the operation shown in FIG. 20.

When the master system determines in S222 that the change in S221 has failed, the master system notifies the requester about the change to the target information of the failure (S224), and then ends the operation shown in FIG. 20.

Note that the case where the change in S221 fails is a case where the target user does not exist in the master system, for example, by the target user being deleted from the master system at the time of the processing in S221, or a case where the master system itself does not have the authority to change the information in the database that stores the information held by the master system.

As shown in FIGS. 17 and 18, the client 28a in the image forming apparatus 20 determines whether there is a response from the master system after the processing of S188 (S189).

When the client 28a determines in S189 that there is no response from the master system, the client 28a determines whether a specific time has elapsed since the execution of the processing of S188 (S190).

When the client 28a determines in S190 that the specific time has not elapsed from the execution of the processing of S188, the client 28a executes the processing of S189.

When the client 28a determines in S190 that the specific time has elapsed from the execution of the processing in S188, the client 28a executes the processing of S188.

When the client 28a determines in S189 that there is a response from the master system, the client 28a determines whether the response from the master system is a notification indicating successful information change (S191).

When the client 28a determines that the response from the master system is not the notification of the successful information change, that is, determined in S191 that the response from the master system is a failure notification, the client 28a notifies about the failure to change the target information by displaying on the display unit 22 or the like (S192).

When the client 28a determines in S191 that the response from the master system is a notification of successful information change, the client 28a determines whether there is a slave system regarding the target information type, based on the notification destination information 54d acquired in S181 (S193).

When the client 28a determines in S193 that there is a slave system regarding the target information type, the client 28a targets one slave system that has not yet notified about the change of the target information among all the slave systems indicated by the notification destination information 54d acquired in S181, regarding the target information type (S194).

Next, the client 28a notifies the target slave system about the change of the target information (S195).

Figure 21:
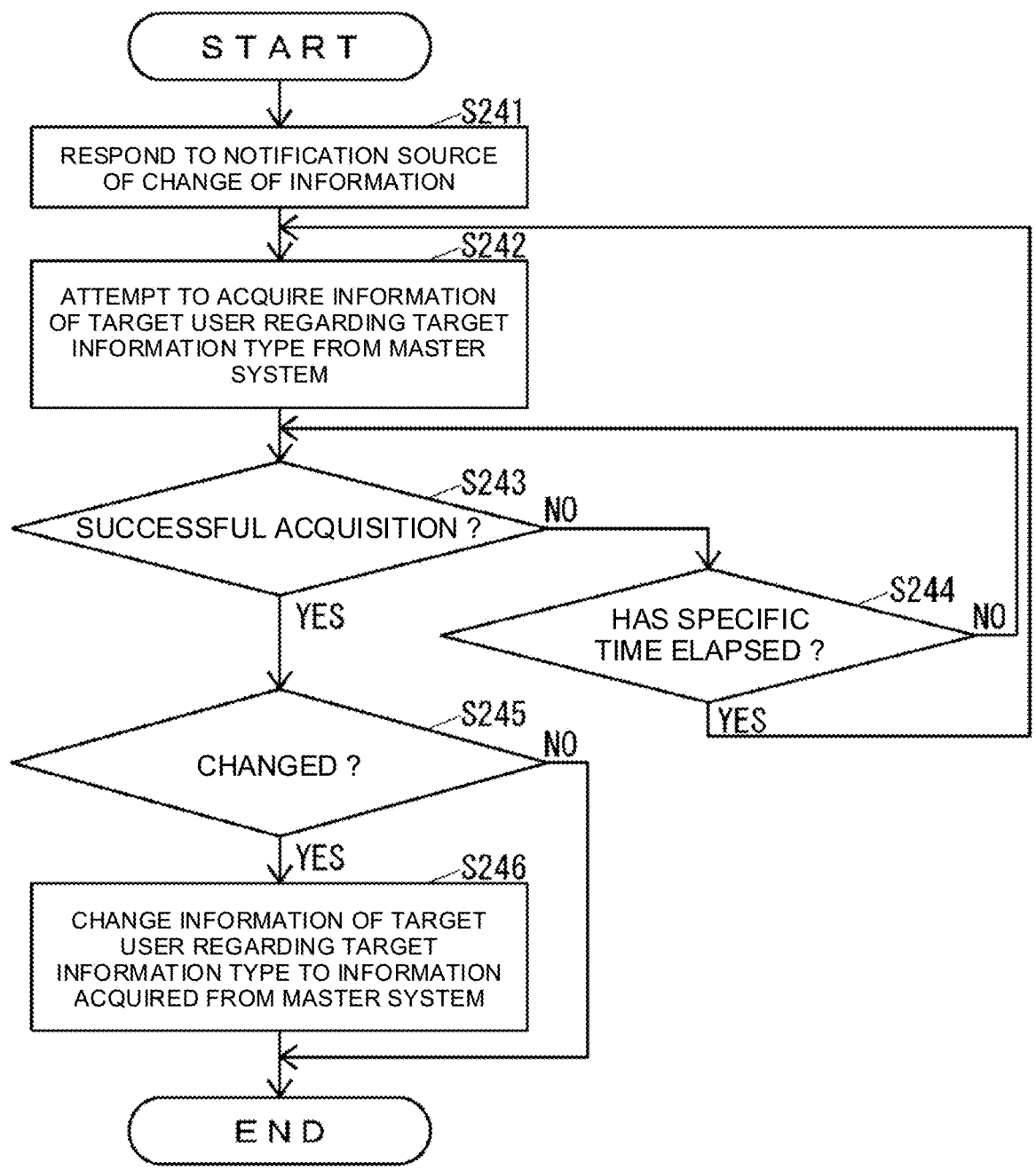
FIG. 21 is a flowchart showing the operation of the slave system when notified about the change of the target information in the operation shown in FIGS. 17 and 18.

FIG. 21 is a flowchart showing the operation of the slave system when the change of the target information is notified in the operation shown in FIGS. 17 and 18.

As shown in FIG. 21, when the slave system is notified about the change of the target information, the slave system responds to the notification source of the change of the target information (S241).

Next, the slave system attempts to acquire the information of the target user regarding the target information type held by the master system of the target information type from the master system of the target information type (S242). Note that, in the case of the document processing flow execution system 50, the slave system identifies the master system of the target information type based on the notification destination information 54d. In the case of a system other than the document processing flow execution system 50, the slave system may inquire of the document processing flow execution system 50 to specify the master system of the target information type. Furthermore, when the slave system itself has a configuration similar to that of the document processing flow execution system 50, the slave system may specify the master system of the target information type, based on the notification destination information owned by the slave system itself.

After the processing of S242, the slave system determines whether the acquisition in S242 is successful (S243).

When the slave system determines in S243 that the acquisition in S242 is not successful, the slave system determines whether a specific time has elapsed since the execution of the processing of S242 (S244).

When the slave system determines in S244 that the specific time has not elapsed since the execution of the processing in S242, the slave system executes the processing in S243.

When the slave system determines in S244 that the specific time has elapsed since the execution of the processing in S242, the slave system executes the processing of S242.

When the slave system determines in S243 that the acquisition by the processing in S242 is successful, the slave system determines whether the information acquired by the processing in S242 is changed from the information of the target user regarding the target information type among the information held by the slave system itself (S245).

When the slave system determines in S245 that the information acquired by the processing in S242 has been changed from the information of the target user regarding the target information type among the information held by the slave system itself, the slave system changes the information of the target user regarding the target information type among the information held by the slave system to the information acquired by the processing of S242 (S246), and then ends the operation shown in FIG. 21.

When the slave system determines in S245 that the information acquired by the processing in S242 has not been changed from the information of the target user regarding the target information type among the information held by the slave system itself, the slave system ends the operation shown in FIG. 21 without changing the information of the target user regarding the target information type among the information held by the slave system itself to the information acquired by the processing of S242.

As shown in FIGS. 17 and 18, after the processing of S195, the client 28a in the image forming apparatus 20 determines whether there is a response from the target slave system (S196).

When the client 28a determines in S196 that there is no response from the target slave system, the client 28a determines whether a specific time has elapsed since the execution of the processing of S195 (S197).

When the client 28a determines in S197 that the specific time has not elapsed from the execution of the processing of S195, the client 28a executes the processing of S196.

When the client 28a determines in S197 that the specific time has elapsed from the execution of the processing of S195, the client 28a executes the processing of S195.

When the client 28a determines in S196 that there is a response from the target slave system, the client 28a determines whether all the slave systems indicated by the notification destination information 54d acquired in S181 have been notified about the change of the target information, regarding the target information type (S198).

When the client 28a determines in S198 that all of the slave systems indicated by the notification destination information 54d acquired in S181, regarding the target information type, have not been notified about the change of the target information the client 28a executes the processing of S194.

When the client 28a completes the processing of S192, determines in S193 that there is no slave system regarding the target information type, or determines in S198 that all the slave systems indicated by the notification destination information 54d acquired in S181 regarding the target information type, have been notified about the change of the target information, the client 28a deletes the target information in the information stored in the RAM in S186 from the RAM (S199).

After the processing of S199, the client 28a determines whether there is any information still in the RAM among the information stored in the RAM in S186 (S200).

When the client 28a determines in S200 that there is any information still in the RAM among the information stored in the RAM in S186, the client 28a executes the processing of S187.

When the client 28a determines in S200 that there is no information in the RAM among the information stored in the RAM in S186, the client 28a ends the operation shown in FIGS. 17 and 18.

Note that, in the operation shown in FIGS. 17 and 18, the client 28a sequentially executes the processing of S188 to S199 for each piece of information stored in the RAM in S186. However, the client 28a may execute the processing of S188 to S199 in parallel for each piece of information stored in the RAM in S186.

Further, in the operation shown in FIGS. 17 and 18, the client 28a sequentially executes the processing of S195 to S197 for each of all the slave systems indicated by the notification destination information 54d acquired in S181 regarding the target information type. However, the client 28a may execute the processing of S195 to S197 in parallel for each of all the slave systems indicated by the notification destination information 54d acquired in S181 regarding the target information type.

The operation when the client 28a in the image forming apparatus 20 changes the information held by each system has been described above. However, the operation when the client 35a in the user terminal 30 changes the information held by each system is also similar to the operation.

As explained above, when the notification destination information 54d is acquired from the document processing flow execution system 50 (S181), and an instruction to change the specific type of information is issued (YES in S185), the image forming apparatus 20 or the user terminal 30 requests that the master system of the specific type of information indicated by the notification destination information 54d change the specific type of information (S188). When the image forming apparatus 20 or the user terminal 30 requests that the master system change the specific type of information, the master system changes the specific type of information held by the master system itself as requested by the image forming apparatus 20 or the user terminal 30 (S221), and notifies the image forming apparatus 20 or the user terminal 30 of the successful change of the specific type of information (S223). When the master system notifies the image forming apparatus 20 or the user terminal 30 that the change of the specific type of information is successful (YES in S191), the image forming apparatus 20 or the user terminal 30 notifies the slave system of the specific type of information indicated by the notification destination information 54d about the change of the specific type of information (S195). When the image forming apparatus 20 or the user terminal 30 notifies the slave system about the change of the specific type of information, the slave system acquires the specific type of information held by the master system from the master system (S242), and changes the specific type of information held by the slave system itself to the information acquired from the master system (S246). According to the configuration, the information processing system 10 can synchronize information among a plurality of systems by the method different from the conventional method.

Since the document processing flow execution system 50 generates the notification destination information 54d based on the actual configuration of the plurality of systems and the priority order information 54b (S141 to S144), the information processing system 10 can reduce the effort of a person to generate the notification destination information 54d based on the actual configuration of the plurality of systems.

In the case that the image forming apparatus 20 or the user terminal 30 acquires the changeability information 54c from the document processing flow execution system 50 (S181), and is instructed to change the specific type of information (YES in S185), when the changeability information 54c indicates that the change regarding the specific type of information is impossible, the image forming apparatus 20 or the user terminal 30 does not request that the master system of the specific type of information change the specific type of information (S186 to S188). With the configuration, the information processing system 10 can prevent changing the information indicated by the changeability information 54c that the change is impossible.

After the image forming apparatus 20 or the user terminal 30 requests that the master system change the specific type of information in S188, when there is no response from the master system for the specific time (YES in S190), the image forming apparatus 20 or the user terminal 30 again requests that the master system change the specific type of information (S188). With the configuration, the image forming apparatus 20 or the user terminal 30 repeatedly requests that the master system change the specific type of information even when the master system is unavailable. Therefore, the information processing system 10 can improve the likelihood of successful change of information in the master system.

After the image forming apparatus 20 or the user terminal 30 notifies the slave system about the change of the specific type of information in S195, when there is no response from the slave system for the specific time (YES in S197), the image forming apparatus 20 or the user terminal 30 again notifies the slave system about the change of the specific type of information (S195). With the configuration, the image forming apparatus 20 or the user terminal 30 repeatedly notifies the slave system about the change of the specific type of information even when the slave system is unavailable. Therefore, the information processing system 10 can improve the likelihood of successful change of information in the slave system.

After the slave system attempts to acquire the specific type of information from the master system at S242, when there is no successful acquisition of the specific type of information from the master system for the specific time (YES in S244), the slave system again attempts to acquire the specific type of information from the master system (S242). With the configuration, the slave system repeats to acquire the specific type of information from the master system even when the master system is unavailable. Therefore, the information processing system 10 can improve the likelihood of successful information change in the slave system.

The document processing flow execution system 50 can cooperate with the authentication and authorization system 60 and the user information holding system 70 in the present embodiment. However, the document processing flow execution system 50 can also cooperate with a new system that is neither the authentication and authorization system 60 nor the user information holding system 70, such as a document management system. When the document processing flow execution system 50 and the new system also hold the same information, the information processing system 10 can synchronize the information by the mechanism described in the present embodiment.

What is claimed is:

1. An information processing system comprising
    a plurality of systems comprising a main system comprising notification destination information indicating a notification destination for a change regarding a specific type of information; and,
    an information processing apparatus configured to be instructed to change the specific type of information in the plurality of systems,
    wherein the notification destination information indicates a master system in the plurality of systems and a slave system in the plurality of systems as the notification destination,
    wherein when the information processing apparatus acquires the notification destination information from the main system, and is instructed to change the specific type of information, the information processing apparatus requests that the master system, of the specific type of information, as indicated by the notification destination information, change the specific type of information,
    wherein when the master system is requested from the information processing apparatus that the specific type of information be changed, the master system changes the specific type of information held by the master system itself as requested by the information processing apparatus, and notifies the information processing apparatus about a successful change of the specific type of information,
    wherein when the information processing apparatus receives notification about the successful change of the specific type of information from the master system, the information processing apparatus notifies the slave system of the specific type of information, as indicated by the notification destination information, about the change of the specific type of information, and
    wherein when the slave system is notified about the change of the specific type of information from the information processing apparatus, the slave system acquires the specific type of information held by the master system from the master system, and changes the specific type of information held by the slave system itself to information acquired from the master system.

2. The information processing system according to claim 1,
    wherein the main system includes priority order information indicating a priority order of the systems regarding the specific type of information, and generates the notification destination information based on an actual configuration of the plurality of systems.

3. The information processing system according to claim 1,
    wherein the main system includes changeability information indicating whether the change regarding the specific type of information is possible, and
    wherein in the case that the information processing apparatus acquires the changeability information from the main system, and is instructed to change the specific type of information, when the changeability information indicates that the change regarding the specific type of information is impossible, the information processing apparatus does not request the master system of the specific type of information to change the specific type of information.

4. The information processing system according to claim 1,
    wherein after the information processing apparatus requests that the master system change the specific type of information, when there is no response from the master system for a specific time, the information processing apparatus again requests that the master system change the specific type of information.

5. The information processing system according to claim 1,
    wherein after the information processing apparatus notifies the slave system about the change of the specific type of information, when there is no response from the slave system for a specific time, the information processing apparatus again notifies the slave system about the change of the specific type of information.

6. The information processing system according to claim 1,
wherein after the slave system attempts to acquire the specific type of information from the master system, when the slave system does not successfully acquire the specific type of information from the master system for a specific time, the slave system again attempts to acquire the specific type of information from the master system.

7. An information processing apparatus which is instructed to change a specific type of information in a plurality of systems comprising a main system that includes notification destination information indicating a notification destination for a change regarding the specific type of information,
wherein the notification destination information indicates a master system in the plurality of systems and a slave system in the plurality of systems as the notification destination,
wherein when the information processing apparatus acquires the notification destination information from the main system, and is instructed to change the specific type of information, the information processing apparatus requests that the master system of the specific type of information, as indicated by the notification destination information, change the specific type of information, and
wherein when the information processing apparatus is notified about a successful change of the specific type of information from the master system, the information processing apparatus notifies the slave system of the specific type of information, as indicated by the notification destination information, about the change of the specific type of information.

8. A non-transitory computer-readable recording medium that stores an information processing program for causing a computer to realize:
a function of acquiring notification destination information from a main system in a plurality of systems that comprise the main system which includes the notification destination information indicating a master system of the plurality of systems and a slave system of the plurality of systems as a notification destination for a change regarding a specific type of information;
a function of requesting the change of the specific type of information to the master system of the specific type of information, as indicated by the notification destination information, when the change of the specific type of information is instructed; and
a function of notifying the slave system of the specific type of information, as indicated by the notification destination information, about the change of the specific type of information when a successful change of the specific type of information is notified from the master system.

* * * * *